(12) United States Patent
Yoshihara

(10) Patent No.: US 8,482,750 B2
(45) Date of Patent: Jul. 9, 2013

(54) PROCESSING APPARATUS AND CONTROL METHOD FOR THE PROCESSING APPARATUS

(75) Inventor: Toshio Yoshihara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1353 days.

(21) Appl. No.: 11/934,422

(22) Filed: Nov. 2, 2007

(65) Prior Publication Data

US 2008/0112004 A1 May 15, 2008

(30) Foreign Application Priority Data

Nov. 9, 2006 (JP) ................................. 2006-304036

(51) Int. Cl.
*G06F 15/00* (2006.01)
*G06K 1/00* (2006.01)

(52) U.S. Cl.
USPC ........................................ 358/1.14; 358/1.15

(58) Field of Classification Search
USPC .......................................... 358/1.14, 1.1, 1.9
See application file for complete search history.

(56) References Cited

U.S. PATENT DOCUMENTS

| | | | | |
|---|---|---|---|---|
| 5,987,225 A | * | 11/1999 | Okano | 358/1.13 |
| 6,785,727 B1 | * | 8/2004 | Yamazaki | 709/229 |
| 2006/0044594 A1 | * | 3/2006 | Shirai | 358/1.14 |

FOREIGN PATENT DOCUMENTS

| | | | |
|---|---|---|---|
| JP | 2000174771 A | | 6/2000 |
| JP | 2000-242460 A | | 9/2000 |
| JP | 2001-147791 A | | 5/2001 |
| JP | 2004-302793 | * | 10/2004 |
| JP | 2004302793 A | | 10/2004 |

OTHER PUBLICATIONS

JP2004-302793 Machine e glish translation.*
Office Action issued for corresponding Japanese Patent Application No. 2006304036.

* cited by examiner

*Primary Examiner* — Thierry Pham
(74) *Attorney, Agent, or Firm* — Rossi, Kimms & McDowell LLP

(57) ABSTRACT

A processing apparatus which is capable of releasing priority use of apparatuses that are reserved for priority use but are not actually used, even when a plurality of apparatuses are used by priority during a particular time period. Reservation records about reservations for priority use of apparatuses are stored in a master machine. In the master machine, it is determined whether or not all the apparatuses on a reservation cooperation list are exclusively reserved during the same time period, by referring to the reservation records. When all the apparatuses which are reserved for priority use during the same time period, the master machine sends an exclusive release permission command to each subordinate machine reserved for priority use during the same time period among all the apparatuses.

8 Claims, 26 Drawing Sheets

| USER TABLE | 1651 |
|---|---|
| USER NAME | IDENTIFICATION NUMBER |
| yamada | 1234 |
| abe | 5678 |
| tanaka | 4321 |

| RESERVATION COOPERATION LIST | 1711 |
|---|---|
| APPARATUS NAME | |
| MFP-A | |
| MFP-B | |
| MFP-C | |

FIG. 6

RESERVATION MANAGEMENT TABLE 1701

| RESERVATION DATE | START TIME | END TIME | STATUS | APPARATUS NAME | USER NAME |
|---|---|---|---|---|---|
| 2006/6/6 | 9:00 | 10:00 | RELEASABLE | MFP-A | yamada |
| 2006/6/6 | 9:00 | 10:00 | RELEASABLE | MFP-B | tanaka |
| 2006/6/6 | 9:00 | 10:00 | RELEASABLE | MFP-C | abe |
| 2006/6/6 | 10:00 | 11:00 | EXCLUSIVE | MFP-A | yamada |
| 2006/6/6 | 10:00 | 11:00 | EXCLUSIVE | MFP-B | tanaka |
| 2006/6/6 | 11:00 | 12:00 | RELEASABLE | MFP-A | yamada |
| 2006/6/6 | 11:00 | 12:00 | RELEASABLE | MFP-B | tanaka |
| 2006/6/6 | 11:00 | 12:00 | RELEASABLE | MFP-C | abe |
| .... | .... | .... | .... | .... | .... |

| | 7:00 | 8:00 | 9:00 | 10:00 | 18:00 |
|---|---|---|---|---|---|
| MFP-A (MASTER) | | | | ▨ | |
| MFP-B (SUBORDINATE MACHINE) | | | | ▨ | |
| MFP-C (SUBORDINATE MACHINE) | | | | ▨ | |

: EXCLUSIVE RESERVED

FIG. 16A

| RESERVATION REQUEST COMMAND ||
|---|---|
| USERNAME | yamada |
| RESERVATION DATE | 2006/06/06 |
| START TIME | 9:00 |
| END TIME | 10:00 |

FIG. 16B

| RESERVATION REQUEST COMMAND ||
|---|---|
| USERNAME | yamada |
| RESERVATION DATE | 2006/06/06 |
| START TIME | 9:00 |
| END TIME | 10:00 |
| STATUS | OK |

FIG. 16C

| RESERVATION REQUEST COMMAND ||
|---|---|
| USERNAME | yamada |
| RESERVATION DATE | 2006/06/06 |
| START TIME | 9:00 |
| END TIME | 10:00 |
| STATUS | NG |

FIG. 17A

| RESERVATION MANAGEMENT TABLE | MFP-A (MASTER) | | | | |
|---|---|---|---|---|---|
| RESERVATION DATE | START TIME | END TIME | STATUS | APPARATUS NAME | USERNAME |
| 2006/6/6 | 9:00 | 10:00 | EXCLUSIVE | MFP-A | yamada |
| 2006/6/6 | 9:00 | 10:00 | EXCLUSIVE | MFP-C | tanaka |

FIG. 17B

| RESERVATION MANAGEMENT TABLE | MFP-B (SUBORDINATE MACHINE) | | | | |
|---|---|---|---|---|---|
| RESERVATION DATE | START TIME | END TIME | STATUS | APPARATUS NAME | USERNAME |

FIG. 17C

| RESERVATION MANAGEMENT TABLE | MFP-C (SUBORDINATE MACHINE) | | | | |
|---|---|---|---|---|---|
| RESERVATION DATE | START TIME | END TIME | STATUS | APPARATUS NAME | USERNAME |
| 2006/6/6 | 9:00 | 10:00 | EXCLUSIVE | MFP-C | abe |

FIG. 18A

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | EXCLUSIVE | MFP-A | yamada |
| 2006/6/6 | 9:00 | 10:00 | EXCLUSIVE | MFP-B | yamada |
| 2006/6/6 | 9:00 | 10:00 | EXCLUSIVE | MFP-C | abe |

FIG. 18B

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | EXCLUSIVE | MFP-B | yamada |

FIG. 18C

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | EXCLUSIVE | MFP-C | abe |

FIG. 19A

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | RELEASABLE | MFP-A | yamada |
| 2006/6/6 | 9:00 | 10:00 | RELEASABLE | MFP-B | yamada |
| 2006/6/6 | 9:00 | 10:00 | RELEASABLE | MFP-C | abe |

FIG. 19B

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | RELEASABLE | MFP-B | yamada |

FIG. 19C

RESERVATION MANAGEMENT TABLE

| RESERVATION DATE | START TIME | END TIME | STATUS | APPARATUS NAME | USERNAME |
|---|---|---|---|---|---|
| 2006/6/6 | 9:00 | 10:00 | RELEASABLE | MFP-C | abe |

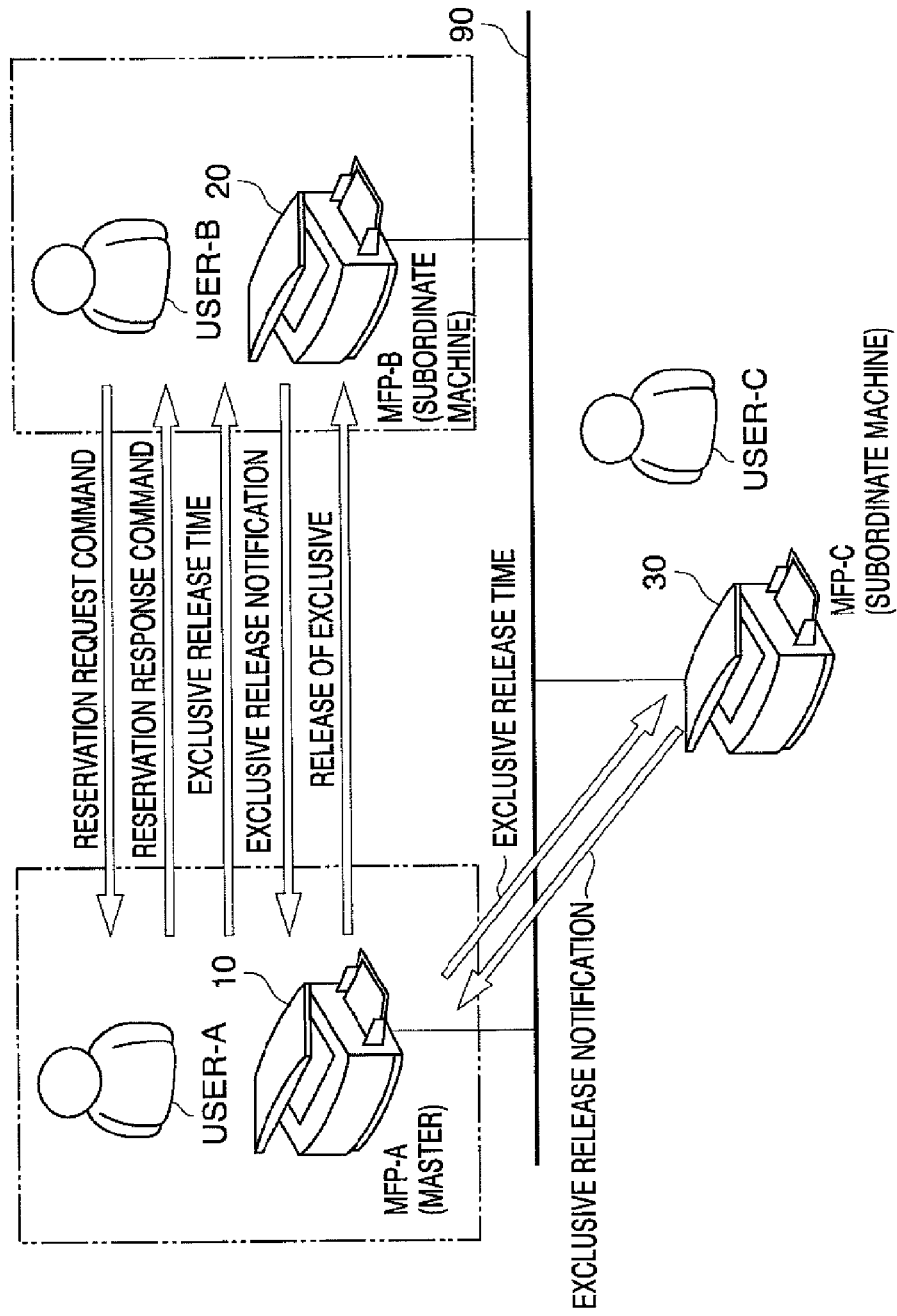

| | 7:00 | 8:00 | 9:00 | 10:00 | 11:00 | .... |
|---|---|---|---|---|---|---|
| MFP-A | | | | | ▨ | .... |
| MFP-B | | | | | ▨ | .... |
| MFP-C | | | ▨ | | | .... |

| EXCLUSIVE RELEASE TIME (MIN) | | | | | | |
|---|---|---|---|---|---|---|
| | 7:00 | 8:00 | 9:00 | 10:00 | 11:00 | .... |
| MFP-A | -- | -- | 10 | 10 | 10 | .... |
| MFP-B | -- | -- | -- | -- | 10 | .... |
| MFP-C | -- | -- | 10 | -- | -- | .... |

: EXCLUSIVE RESERVED

| | 7:00 | 8:00 | 9:00 | 10:00 | 11:00 | .... |
|---|---|---|---|---|---|---|
| MFP-A | | | ▨ | ▨ | ▨ | .... |
| MFP-B | | | ▨ | | | .... |
| MFP-C | | | ▨ | | | .... |

| EXCLUSIVE RELEASE TIME (MIN) | | | | | | |
|---|---|---|---|---|---|---|
| | 7:00 | 8:00 | 9:00 | 10:00 | 11:00 | .... |
| MFP-A | -- | -- | 5 | 10 | 10 | .... |
| MFP-B | -- | -- | 5 | -- | 10 | .... |
| MFP-C | -- | -- | 5 | -- | -- | .... |

: EXCLUSIVE RESERVED

PROCESSING APPARATUS AND CONTROL METHOD FOR THE PROCESSING APPARATUS

BACKGROUND OF THE INVENTION

1. Field of the Invention

The present invention relates to a processing apparatus which provides a priority reservation service and using apparatuses, such as digital multifunction peripherals and printers, which are connected with one another via a network, and a control method for the processing apparatus.

2. Description of the Related Art

As a technique enabling a user to use a digital multifunction peripheral by priority during a particular time period, reservation of a print job has been known. By a user reserving a digital multifunction peripheral to use his job by priority or refuse jobs from other users during a particular time period, the user can exclusively use the digital multifunction peripheral (see Japanese Laid-Open Patent Publication (Kokai) No. 2000-242460).

However, once a digital multifunction peripheral is in exclusive status, the digital multifunction peripheral cannot be used until the reserved exclusive time has elapsed, even if the digital multifunction peripheral is not used. In order to solve this problem, a method is disclosed in which the exclusive status is compulsorily released if printing is not started within a predetermined time period (see Japanese Laid-Open Patent Publication (Kokai) No. 2001-147791).

However, the above described conventional technique is not appropriate for neither the user who has reserved exclusive use nor users who have not reserved exclusive use. For example, in an office where a plurality of apparatuses including digital multifunction peripherals are installed, when only a part of the plurality of apparatuses are in exclusive status, it is not matter even if the part of the apparatuses are in exclusive status for a certain amount of time. However, if many of the plurality of apparatuses are in exclusively status, it is necessary to release exclusive of apparatuses which are reserved but are not actually used, as quickly as possible.

SUMMARY OF THE INVENTION

The present invention provides a processing apparatus and a control method therefor which are capable of releasing priority use of apparatuses that are reserved for priority use but are not actually used, even when a plurality of apparatuses are used by priority during a particular time period.

In a first aspect of the present invention, there is provided a processing apparatus capable of communicating with a plurality of apparatuses, comprising a reservation information storing unit adapted to store reservation information about reservations for priority use of the plurality of apparatuses, a determining unit adapted to determine whether or not the number of apparatuses which are not reserved for priority use during a predetermined time period among the plurality of apparatuses is a predetermined number, by referring to the reservation information, and an issuing unit adapted to issue an instruction to enable release of a reservation for priority use of an apparatus during the predetermined time period to the apparatus reserved for priority use during the predetermined time period among the plurality of apparatuses, when the number of apparatuses which are not reserved for priority use during the predetermined time period among the plurality of apparatuses is the predetermined number.

In a second aspect of the present invention, there is provided a processing apparatus capable of communicating with a plurality of apparatuses, comprising, a reservation information storing unit adapted to store reservation information about reservations for priority use of the plurality of apparatuses, a determining unit adapted to determine whether or not the number of apparatuses which are not reserved for priority use during a predetermined time period among the plurality of apparatuses is a predetermined number, by referring to the reservation information, and an issuing unit adapted to issue an instruction to set time required until the a reservation for priority use of an apparatus during the particular time period is automatically released to a the predetermined time period, to the apparatus reserved for priority use during the predetermined time period among the plurality of apparatuses, when the number of apparatuses which are not reserved for priority use during the predetermined time period among the plurality of apparatuses is the predetermined number.

According to the present invention, it is possible to, even when a plurality of apparatuses are used by priority during a particular time period, release priority use of apparatuses that are reserved but are not actually used.

Furthermore, according to the present invention, it is possible to reduce the waiting time of a user who is waiting for release of the priority use, while keeping the convenience for users who reserved priority use of digital multifunction peripherals.

Further features and advantages of the present invention will become apparent from the following detailed description of exemplary embodiments with reference to the attached drawings.

BRIEF DESCRIPTION OF THE DRAWINGS

FIG. 6 is a diagram showing an example of a reservation management table held by a reservation management table holding section in FIG. 2.

FIG. 16A is a diagram showing an example of the format of a reservation request command used for the exclusive reservation processing, and FIGS. 16B and 16C are diagrams showing examples of reservation response commands respectively.

FIG. 17A is a diagram showing an example of the reservation management table in a digital multifunction peripheral 10; FIG. 17B is a diagram showing an example of the reservation management table in a digital multifunction peripheral 20; and FIG. 17C is a diagram showing an example of the reservation management table in a digital multifunction peripheral 30.

FIG. 18A is a diagram showing the reservation management table in the digital multifunction peripheral 10 after exclusive reservations are accepted; FIG. 18B is a diagram showing the reservation management table in the digital multifunction peripheral 20 after an exclusive reservation is accepted; and FIG. 18C is a diagram showing the reservation management table in the digital multifunction peripheral 30 after an exclusive reservation is accepted.

FIG. 19A is a diagram showing an example of the reservation management table in the digital multifunction peripheral 10 after the mode has transitioned to an exclusive releasable mode; FIG. 19B is a diagram showing an example of the reservation management table in the digital multifunction peripheral 20 after the mode has transitioned to the exclusive releasable mode; and FIG. 19C is a diagram showing an example of the reservation management table in the digital multifunction peripheral 30 after the mode has transitioned to the exclusive releasable mode.

FIG. 25 is a diagram showing the flow of an exclusive reservation process and an exclusive release process performed in the printing system in FIG. 24.

DETAILED DESCRIPTION OF THE PREFERRED EMBODIMENTS

Embodiments of the present invention will be described in detail with reference to drawings showing preferred embodiments thereof.

Figure 1:
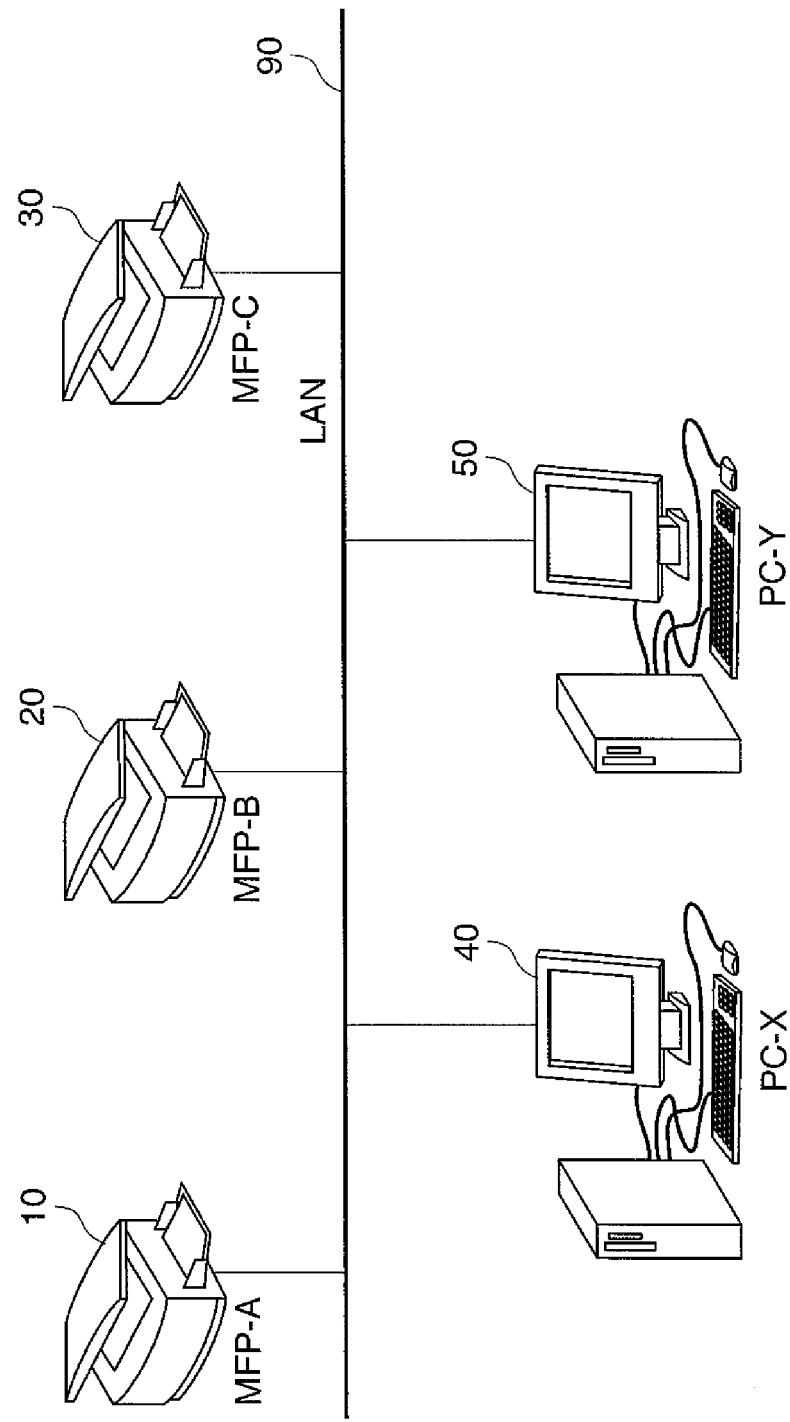
FIG. 1 is a diagram schematically showing a configuration example of a printing system to which is applied a processing apparatus according to a first embodiment of the present invention.

FIG. 1 is a diagram schematically showing a configuration example of a printing system to which is applied a processing apparatus according to a first embodiment of the present invention.

In FIG. 1, this printing system is configured by digital multifunction peripherals 10 (MFP-A), 20 (MFP-B) and 30 (MFP-C), host computers 40 (PC-X) and 50 (PC-Y), and a local area network (LAN) 90 which connects them to one another.

Each of the digital multifunction peripherals 10 to 30 has an image input/output function and performs reading an image from an original and print output of the image. Image data indicative of the read image is stored in the storage device in the digital multifunction peripheral, or it is transferred to the other digital multifunction peripherals or the host computers, via the LAN 90. Each of the digital multifunction peripherals 10 to 30 can receive print data from the host computer 40 or the like or receive image data from the other digital multifunction peripherals to print out an image based on the print data or the image data. In this printing system, the plurality of digital multifunction peripherals 10 to 30 and the host computers 40 and 50 are connected to one another via the LAN 90, and printing processing can be performed by these apparatuses in cooperation with one another. It goes without saying that the number of the digital multifunction peripherals 10 to 30 and the host computers 40 and 50 constituting this printing system is not limited to the number shown in the figure.

Figure 2:
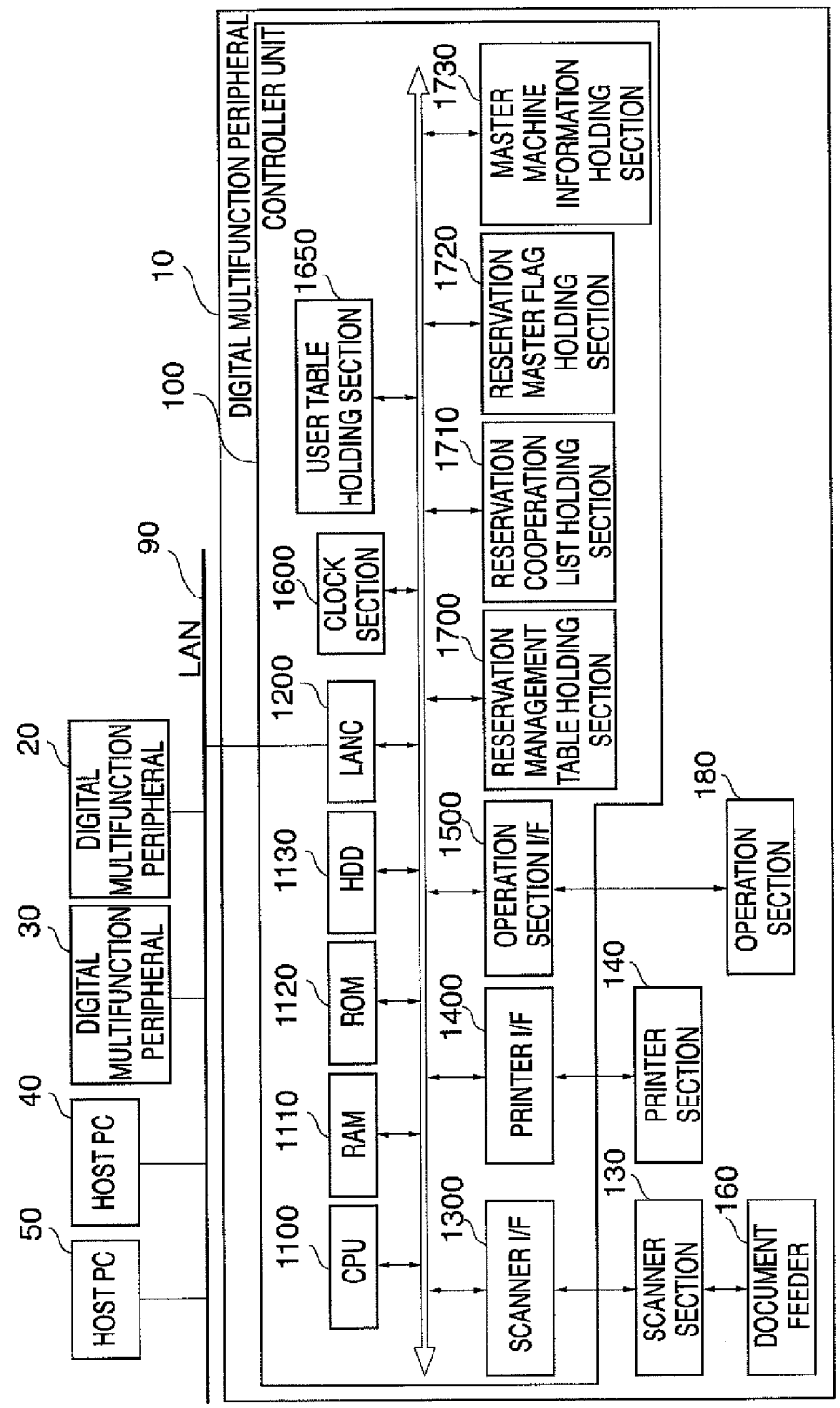
FIG. 2 is a block diagram showing the configuration of a digital multifunction peripheral in FIG. 1.

FIG. 2 is a block diagram showing the configuration of the digital multifunction peripheral 10 in FIG. 1. Since the configuration of the digital multifunction peripherals 20 and 30 is the same as that of the digital multifunction peripheral 10, description thereof will be omitted.

In FIG. 2, the digital multifunction peripheral 10 is comprised of a controller unit 100, a scanner section 130 which is an image input device, a printer section 140 which is an image output device, a document feeder 160, and an operation section 180.

The controller unit 100, which is connected to the scanner section 130, the printer section 140 and the operation section 180, controls the operation of each of these sections, and performs input/output of image data or device information via the LAN 90. The controller unit 100 is comprised of a CPU 1100, a RAM 1110, a ROM 1120, an HDD 1130, an LANC 1200, a scanner I/F 1300, a printer I/F 1400, an operation section I/F 1500, and an internal bus 1000 which connects them to one another.

The CPU (central processing unit) 1100 is a processor controlling the whole digital multifunction peripheral 10. The RAM (random access memory) 1110 is a system work memory used for the operation of the CPU 1100. The RAM 1110 is also an image memory for temporarily storing image data. The ROM (read-only memory) 1120 is a boot ROM and stores a boot program in the digital multifunction peripheral 10.

The HDD (hard disk drive) 1130 stores system software (bootable), image data, software counter values, and the like. The system software (bootable) is a program for realizing functions such as copying, scanning and printing, and it is developed on the RAM 1110 and operates there. A counter area for each paper size and a counter area for the amount of data processing are set for the software counter values, and count-up is performed by calculating the software counter values on the basis of the number of image outputs or the amount of data processed by the CPU 1100, with predetermined reference capacity value as the baseline. Storage of the software counter values is not limited to the HDD 1130. They may be stored in an EEPROM (electronically erasable and programmable ROM) or the like which is capable of storage and retention even when the power is cut.

The LANC 1200 is connected to the LAN 90 to perform input/output of image data or input/output of information related to control of the apparatuses. For example, the LANC 1200 is capable of receiving image data from a host computer or a digital multifunction peripheral on the LAN 90 or sending image data inputted to the digital multifunction peripheral 10 to a host computer or a digital multifunction peripheral on the LAN 90.

The printer I/F 1400 is connected to the printer section 140 and performs communication with the printer section 140. It also performs synchronous system/asynchronous system conversion of image data. The scanner I/F 1300 is connected to the scanner section 130 and performs communication with the scanner section 130. The scanner I/F 1300 also performs synchronous system/asynchronous system conversion of image data. The scanner section 130 can be connected to the document feeder 160 to continuously read images from originals set in the document feeder 160.

The operation section I/F 1500 is connected to the operation section 180 and outputs image data to be displayed on the operation section 180. The operation section I/F 1500 also plays a role of communicating information inputted from the operation section 180 by a user, to the CPU 1100. An input operation on the operation section 180 is recognized and processed by a program executed by the CPU 1100, via the operation section I/F 1500. Thereby, it is possible to make settings for the whole apparatus and execution instruction of various functions to perform copying or scan processing.

The controller unit 100 is comprised of a clock section 1600, a user table holding section 1650, a reservation management table holding section 1700, a reservation cooperation list holding section 1710, a reservation master flag holding section 1720, and a master machine information holding section 1730.

The clock section 1600 provides date and time information for the CPU 1100. By using this date and time information and a reservation management table to be described later, the user can occupy the apparatus. The clock section 1600 is configured to be capable of creating backup by a battery, not shown, and it holds the date and time information even when the power to the apparatus is off.

Figures 3, 4, 5:
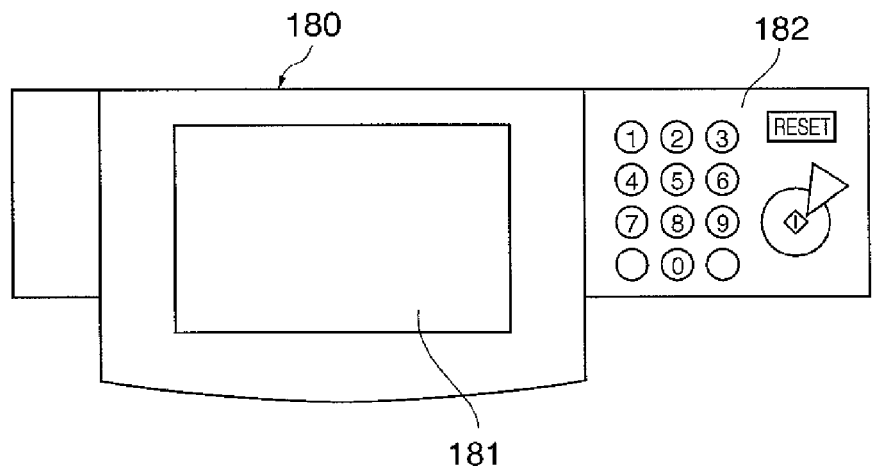
FIG. 3 is a diagram showing an example of the external appearance of an operation section in FIG. 2.
FIG. 4 is a diagram showing an example of a user table held by a user table holding section in FIG. 2.
FIG. 5 is a diagram showing an example of a reservation cooperation list held by a reservation cooperation list holding section in FIG. 2.

The user table holding section 1650 has a user table for managing users who use the digital multifunction peripheral. FIG. 4 shows an example of the user table held by the user table holding section 1650 in FIG. 2.

In FIG. 4, the usernames and identification numbers of users who can use the apparatus are recorded in a user table 1651 in advance. Combination of this user table 1651 and the reservation management table described later enables exclusive reservation of the apparatus.

The reservation management table holding section 1700 holds the reservation management table. The contents of the reservation management table differ according a set value ("true" or "false") held by the reservation master flag holding section 1720. The details of the reservation management table will be described later.

The reservation cooperation list holding section 1710 holds information identifying digital multifunction peripherals to cooperate for an exclusive reservation service. The exclusive reservation service is a service for accepting a reservation to occupy a digital multifunction peripheral during a certain time period.

FIG. 5 shows an example of a reservation cooperation list held by the reservation cooperation list holding section 1710 in FIG. 2. In FIG. 5, the names of multiple digital multifunction peripherals to cooperate for the exclusive reservation service are registered in a reservation cooperation list 1711. Though the names of the digital multifunction peripherals are registered in the figure, the format is not limited to this format if the information can identify the digital multifunction peripherals. For example, the specific names or IP addresses of the apparatuses are conceivable as the information which can identify the apparatuses. The reservation cooperation list 1711 is assumed to be set for each apparatus via the operation section 180 when this printing system is introduced.

The reservation master flag holding section 1720 holds a flag "true" in the case of a master machine of the exclusive reservation service and a flag "false" in the case of a subordinate machine. In the first embodiment, among the plurality of apparatuses (i.e., the digital multifunction peripherals 10 to 30) registered in the reservation cooperation list in FIG. 5 described later, one is a master machine, and the apparatuses other than the master machine are subordinate machines.

The flag held by the reservation master flag holding section 1720 can be set by the operation section 180. The initial value of the flag is set to "false", and "true" is set only for the apparatus to be a master machine when the printing system is introduced.

The master machine information holding section 1730 holds information identifying a master machine for the exclusive reservation service, for example, an apparatus name. The information held by the master machine information holding section 1730 is used to identify an apparatus to be the destination of a reservation request command.

FIG. 3 is a diagram showing an example of the external appearance of the operation section 180 in FIG. 2.

In FIG. 3, the operation section 180 is provided with a touch panel 181 and a push button 182. The touch panel 181 is used both as a display device for displaying an image and as an input for a user to perform input by touching the surface thereof. The push button 182 instructs operations such as input of a numeric value by a numeric keypad and start of copy processing.

The operation section 180 mainly accepts the settings for the whole apparatus and instructions to execute various functions such as copying and scanning. It also accepts exclusive reservations of the digital multifunction peripherals 10 to 30. The digital multifunction peripherals 20 and 30 are also provided with an operation section 180 having an external appearance similar to that shown in the figure.

FIG. 6 is a diagram showing an example of the reservation management table held by the reservation management table holding section 1700 in FIG. 2.

In FIG. 6, a reservation management table 1701 is a table for managing the reservation status of the digital multifunction peripherals. In this table, reservation records each of which includes a reservation date, start time, end time, status, an apparatus name and a username are listed as reservation information.

In the reservation management table 1701, "status" indicates whether the mode is an exclusive mode in which the apparatus is exclusively used by a certain user or an exclusive releasable mode in which the exclusive can be released. The status "exclusive" indicates that the mode is the exclusive mode, and "releasable" indicates that the mode is the exclusive releasable mode. The exclusive releasable mode means, for example, a state in which a third party other than the user who reserved the apparatus can release the exclusive with a common password. That is, in the exclusive releasable mode, though the digital multifunction peripheral is exclusively used by a certain user, the exclusive can be released when it is not used by the user. However, in the case where the user who reserved the exclusive inputted a correct identification number on the "exclusive" screen in FIG. 13 and uses the master machine, a third party cannot release the exclusive.

In the reservation management table 1701, only reservation information valid at the current time point is managed. Therefore, information about a cancelled exclusive reservation and information about a reservation whose time has expired are not managed.

The master machine has a reservation management table about the reservation status of itself and the subordinate machines on the LAN 90. On the other hand, each of the subordinate machines has a reservation management table about the reservation status of itself. Therefore, in the reservation management table managed by the subordinate machine, only the apparatus name of itself is shown in the apparatus name column.

Next, the operation of the digital multifunction peripheral 10 performed in response to an exclusive reservation operation by a user will be described, with reference to FIGS. 7 to 12. Though the user performs the exclusive reservation operation on the digital multifunction peripheral 10, it is also possible to perform the reservation operation from the other digital multifunction peripherals 20 and 30 connected via the LAN 90.

Figure 7:
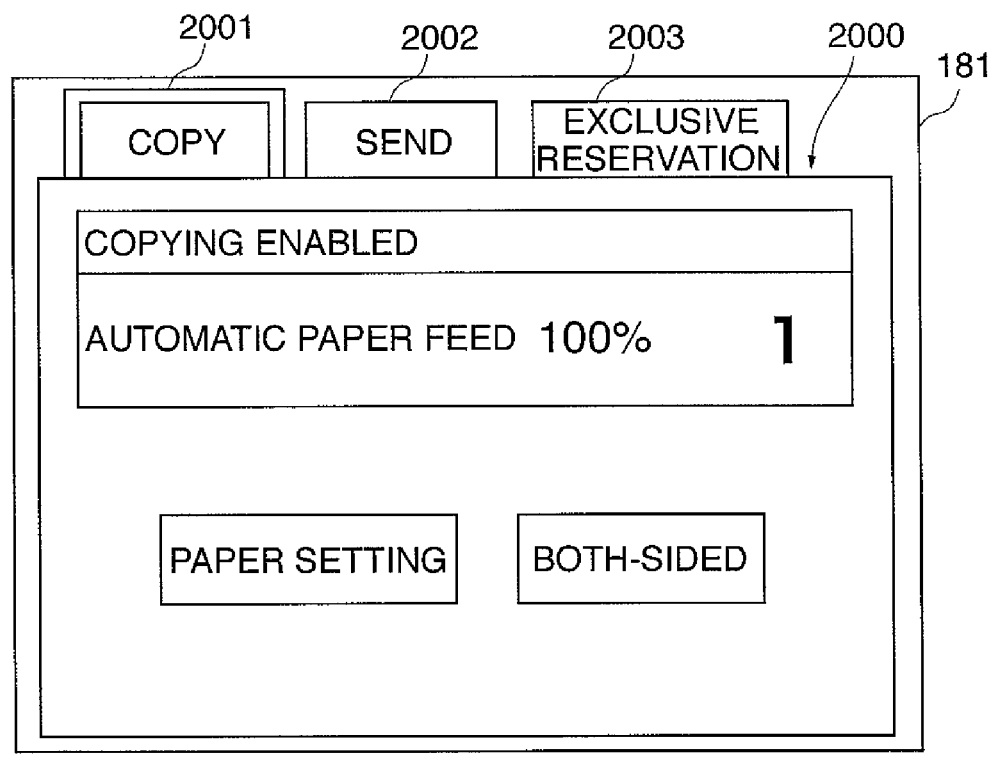
FIG. 7 is a diagram showing an example of a standby screen displayed on the touch panel on the digital multifunction peripheral.

FIG. 7 is a diagram showing an example of a standby screen displayed on the touch panel 181 on the digital multifunction peripheral.

In FIG. 7, "copying enabled" is displayed on a standby screen 2000, which indicates that a copy operation is possible. On the standby screen 2000, a copy tab 2001, a send tab 2002 and an exclusive reservation tab 2003 are also displayed. By the user pressing each tab, the screen is switched so that each function can be used.

When the user uses the copy function, he presses the copy tab 2001 to display the screen shown in the figure. In the case of sending scanned image data to another apparatus on the LAN 90, such as the digital multifunction peripheral 20 and the host computer 40, the user presses the send tab 2002. In reserving exclusive, the user presses the exclusive reservation tab 2003.

Figure 8:
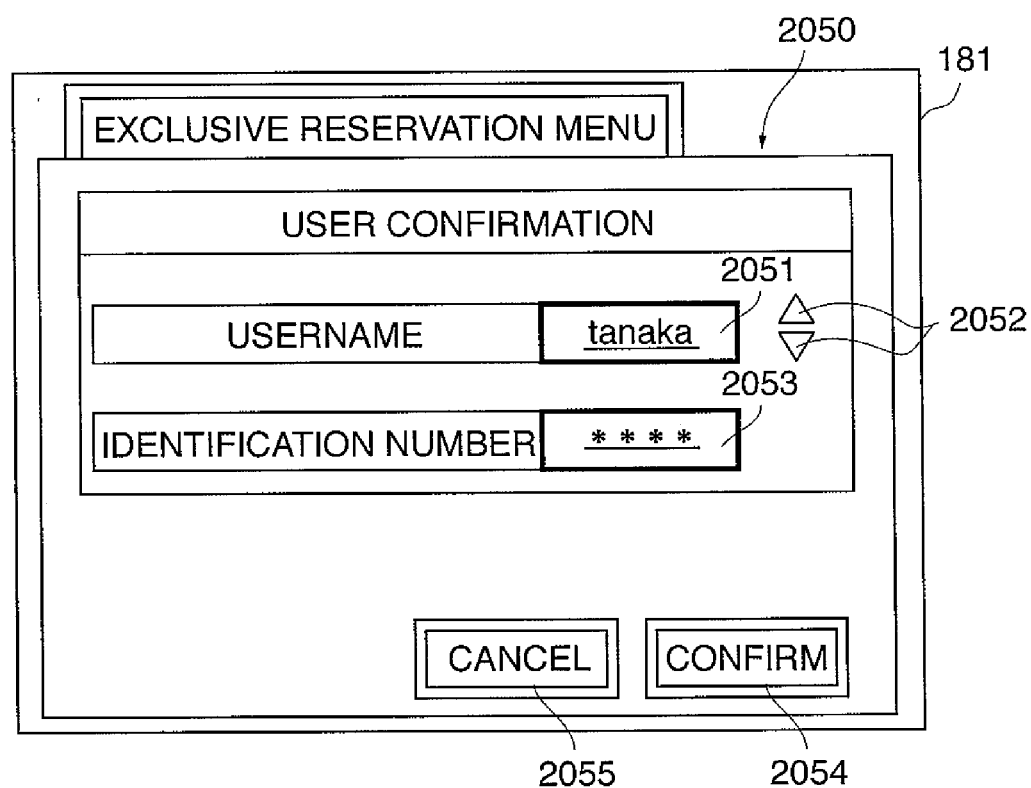
FIG. 8 is a diagram showing an example of a user login screen displayed on the touch panel of the digital multifunction peripheral.

FIG. 8 is a diagram showing an example of a user login screen displayed on the touch panel 181 of the digital multifunction peripheral.

In FIG. 8, a user login screen 2050 is a screen to be displayed on the touch panel 181 when the exclusive reservation tab 2003 in FIG. 7 is pressed. In a username display section 2051, the username of one of the users registered in the user table held by the user table holding section 1650 is displayed. By scrolling with a scroll button 2052, the usernames are sequentially switched and displayed.

The identification number used for login is configured by input with the numeric keypad on the push button 182. When the identification number is inputted with the numeric keypad, it is mask-displayed in an identification number display section 2053 as "*" marks. When a confirm button 2054 is pressed after a username is selected and a valid identification number is inputted, the screen is switched to an unreserved time confirmation screen 2100 shown in FIG. 9.

On the other hand, when the user wants to stop the exclusive reservation and returns to the standby screen 2000 in FIG. 7, he presses a cancel button 2055.

Figure 9:
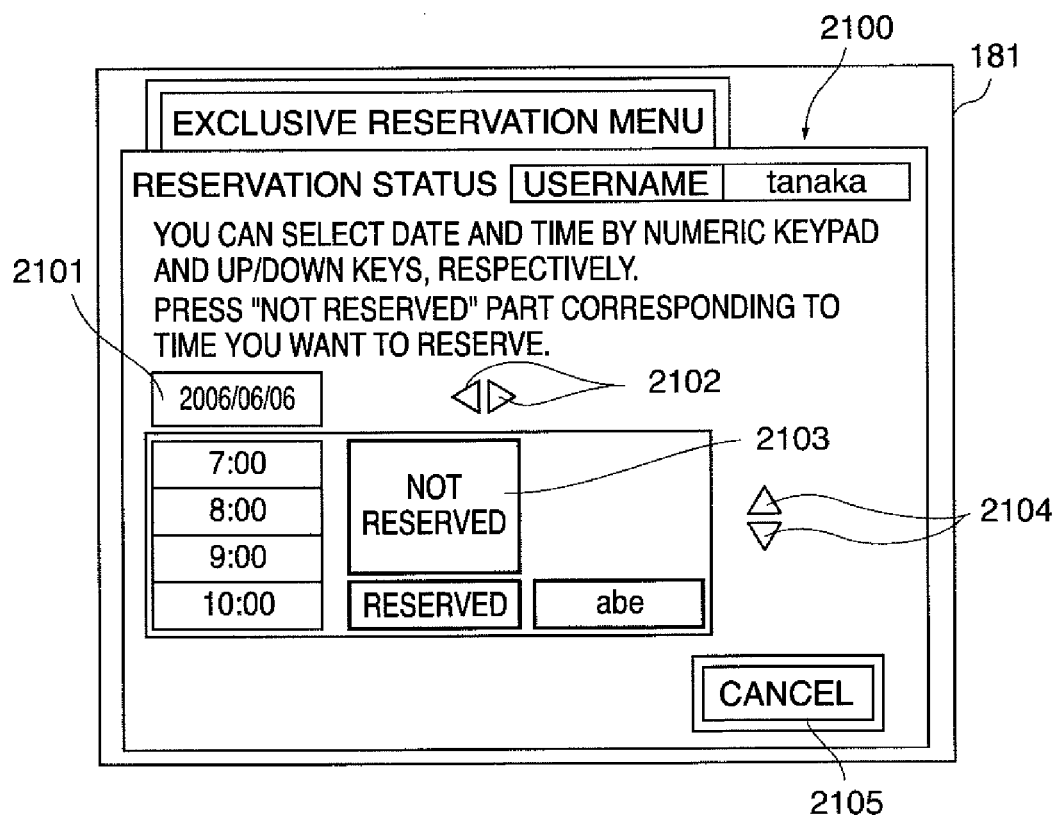
FIG. 9 is a diagram showing an example of an unreserved time confirmation screen for confirming the reservation status of the digital multifunction peripheral.

FIG. 9 is a diagram showing an example of an unreserved time confirmation screen for confirming the reservation status of the digital multifunction peripheral.

In FIG. 9, on the unreserved time confirmation screen 2100, the user first inputs a reservation date with the use of the numeric keypad on the push button 182. The inputted date is displayed in a date display section 2101. The date can be changed by pressing a scroll button 2102.

When the date is selected, the reservation status is displayed. The user checks whether the time period which he wants to reserve exclusive is unreserved, with the use a scroll button 2104. In the example shown in the figure, it is shown that the time period from 7:00 to 10:00 is unreserved, and that the time period from 10:00 to 11:00 is reserved. By the user pressing a part 2103 indicative of the unreserved status, the screen is switched to a reservation execution screen 2200 in FIG. 10.

On the other hand, in the case where the desired time period is already reserved, and the user cancels the use of the exclusive reservation service, he presses a cancel button 2105 to return to the standby screen 2000 in FIG. 7.

Figure 10:
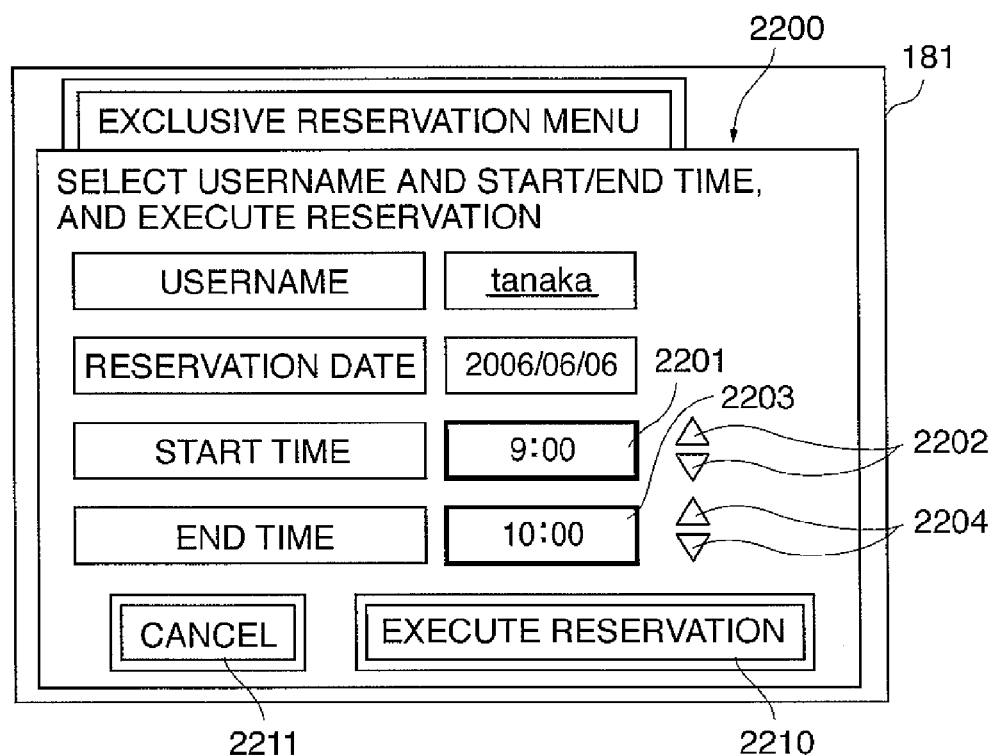
FIG. 10 is a diagram showing an example of a reservation execution screen for setting detailed reservation time for the digital multifunction peripheral.
Figure 11:
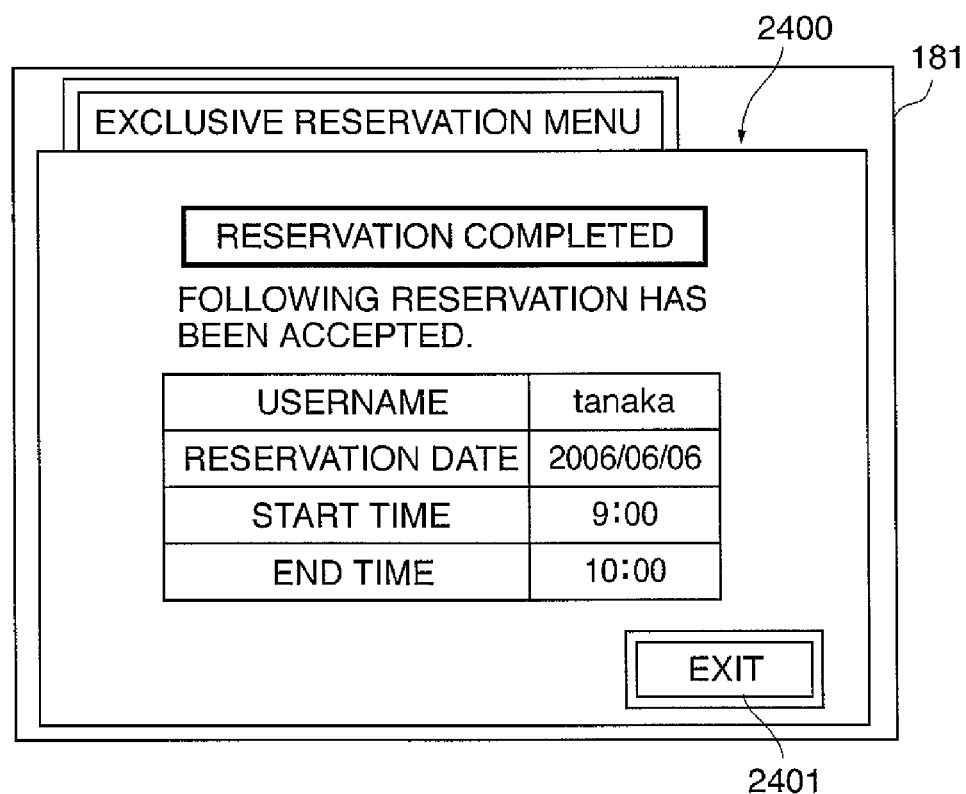
FIG. 11 is a diagram showing an example of an exclusive reservation execution result confirmation screen to be displayed when a reservation is normally accepted.
Figure 12:
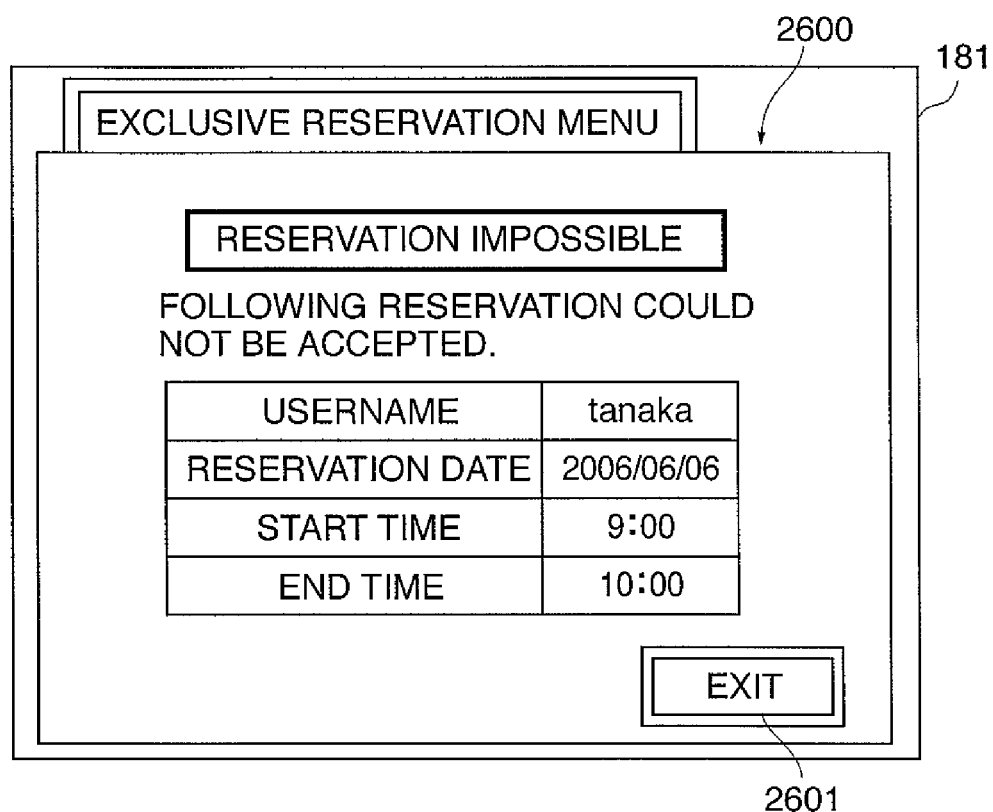
FIG. 12 is a diagram showing an example of an exclusive reservation execution result confirmation screen to be displayed when a reservation is impossible.

FIG. 10 is a diagram showing an example of a reservation execution screen for setting detailed reservation time for the digital multifunction peripheral. FIG. 11 is a diagram showing an example of an exclusive reservation execution result confirmation screen to be displayed when an exclusive reservation is normally accepted. FIG. 12 is a diagram showing an example of an exclusive reservation execution result confirmation screen to be displayed when an exclusive reservation is impossible.

In FIG. 10, the user can correct or change the desired time period, on the reservation execution screen 2200.

Start time is displayed in a start time display section 2201. The start time can be adjusted within the range of unreserved time by operating a scroll button 2202. End time is displayed in an end time display section 2203. The end time can be adjusted within the range of the unreserved time by operating a scroll button 2204.

When having determined the desired time period, the user presses a reservation execution button 2210 to execute the reservation. On the other hand, if the user wants to check the unreserved time again, he presses a return button 2211 to return to the unreserved time confirmation screen 2100 in FIG. 9.

When the reservation execution button 2210 is pressed, the screen is switched to any of an exclusive reservation execution result confirmation screen 2400 shown in FIG. 11 and an exclusive reservation execution result confirmation screen 2600 shown in FIG. 12. When the exclusive reservation is normally accepted, the exclusive reservation execution result confirmation screen 2400 is displayed. On the other hand, when the exclusive reservation is not accepted, the exclusive reservation execution result confirmation screen 2600 is displayed. In any of the cases, the screen returns to the standby screen in FIG. 7 by pressing an exit button 2401 or 2601.

Figure 13:
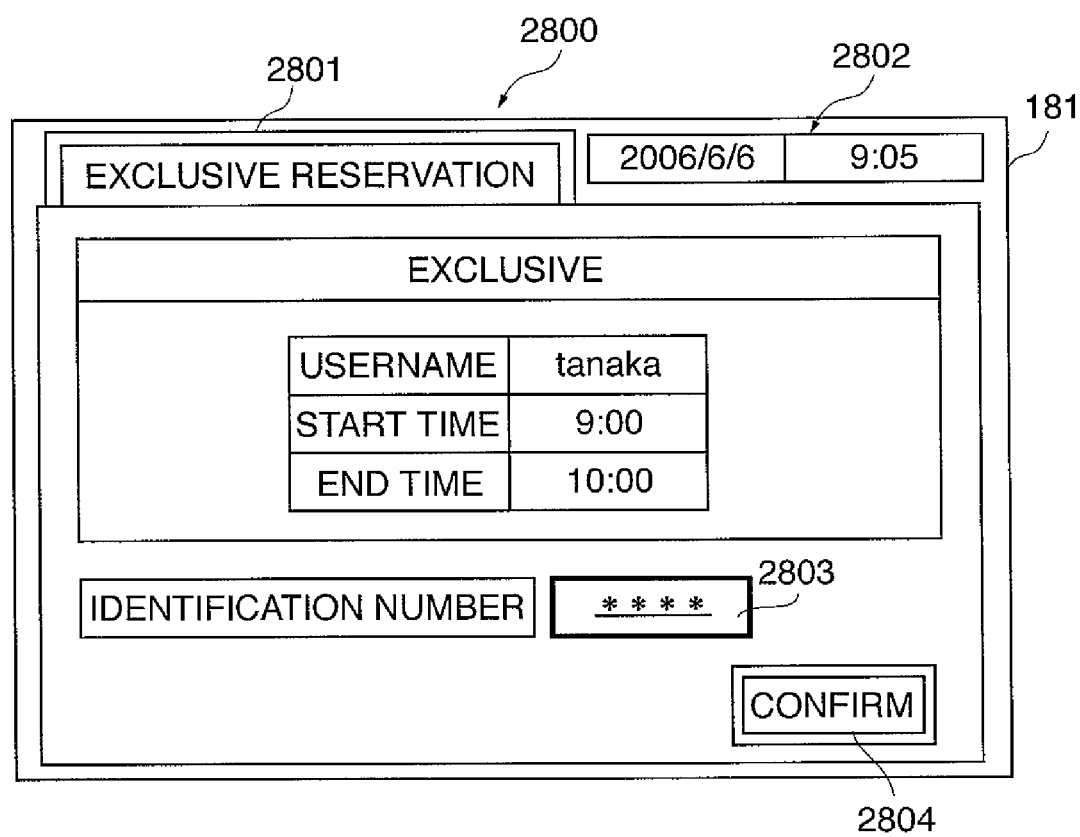
FIG. 13 is a diagram showing an example of an "exclusive" screen to be displayed on the touch panel when the start time is reached.

FIG. 13 is a diagram showing an example of an "exclusive" screen to be displayed on the touch panel 181 when the start time is reached.

In FIG. 13, an "exclusive use" screen 2800 is a screen for showing the user that the digital multifunction peripheral concerned is exclusively used, and the name of the user who reserved the exclusive use, the start time and the end time are displayed. An exclusive reservation tab 2801 indicates that the digital multifunction peripheral is currently exclusively used. The current date and time is displayed in a date and time display section 2802, which indicates "9:05" on "2006/06/06".

The user who reserved the exclusive use inputs an identification number in an identification number display section 2803 with the use of the numeric keypad to use the digital multifunction peripheral 10 and presses a confirm button 2804. When a valid identification number is inputted, the standby screen 2000 in FIG. 7 is displayed, and the user can use the digital multifunction peripheral 10 excluding jobs from other users, during the exclusive reservation time.

Next, the exclusive reservation processing in the printing system in FIG. 1 will be described, with reference to FIGS. 14 to 19.

Figure 14:
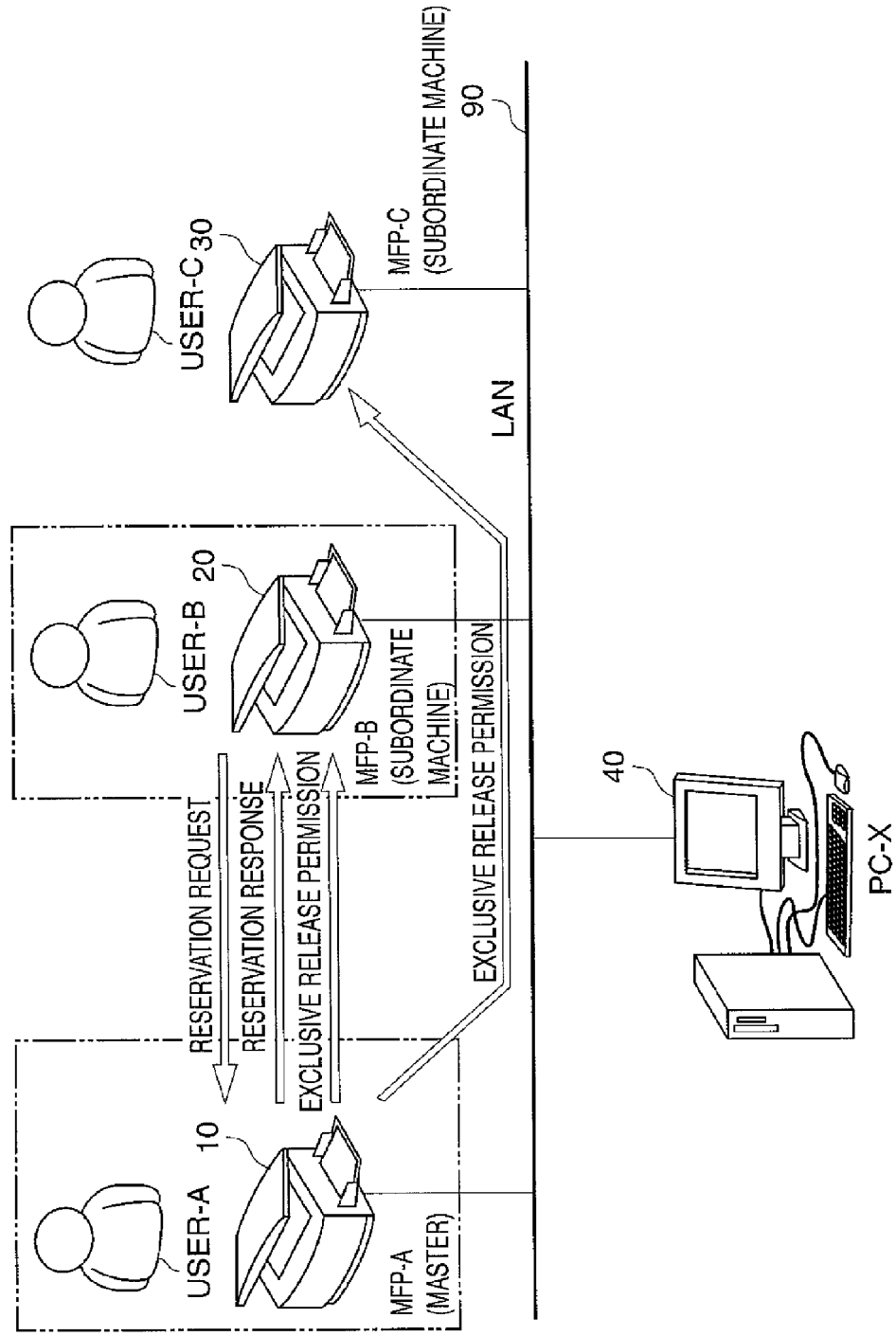
FIG. 14 is a diagram showing the flow of an exclusive reservation process performed in the printing system of FIG. 1.
Figure 15:
FIG. 15 is a schematic diagram showing the reservation status of the printing system of FIG. 1.

FIG. 14 is a diagram showing the flow of an exclusive reservation process performed in the printing system of FIG. 1. FIG. 15 is a schematic diagram showing the reservation status of the printing system of FIG. 1. FIG. 16A is a diagram showing an example of the format of a reservation request command used for the exclusive reservation processing, and FIGS. 16B and 16C are diagrams showing examples of reservation response commands respectively.

FIGS. 17 to 19 are diagrams showing an example of transition of the status of the reservation management table when exclusive is reserved. Specifically, FIG. 17A is a diagram showing an example of the reservation management table in the digital multifunction peripheral 10; FIG. 17B is a diagram showing an example of the reservation management table in the digital multifunction peripheral 20; and FIG. 17C is a diagram showing an example of the reservation management table in the digital multifunction peripheral 30. FIG. 18A is a diagram showing the reservation management table in the digital multifunction peripheral 10 after exclusive reservations are accepted; FIG. 18B is a diagram showing the reservation management table in the digital multifunction peripheral 20 after an exclusive reservation is accepted; and FIG. 18C is a diagram showing the reservation management table in the digital multifunction peripheral 30 after an exclusive reservation is accepted. FIG. 19A is a diagram showing an example of the reservation management table in the digital multifunction peripheral 10 after the mode has transitioned to the exclusive releasable mode; FIG. 19B is a diagram showing an example of the reservation management table in the digital multifunction peripheral 20 after the mode has transitioned to the exclusive releasable mode; and FIG. 19C is a diagram showing an example of the reservation management table in the digital multifunction peripheral 30 after the mode has transitioned to the exclusive releasable mode.

In FIG. 14, it is assumed that the digital multifunction peripheral 10 (MFP-A) functions as a master machine, and each of the digital multifunction peripheral 20 (MFP-B) and the digital multifunction peripheral 30 (MFP-C) functions as a subordinate machine. The flow of the exclusive reservation processing will be described with regard to (1) a reservation request phase, (2) a reservation response phase and (3) an exclusive release permission phase in that order.

(1) Reservation Request Phase

A user B (USER-B) operates the operation section 180 on the digital multifunction peripheral 20 to reserve exclusive of the digital multifunction peripheral 20 from 9:00 to 10:00. In this case, the above exclusive reservation processing described above with reference to FIGS. 7 to 10 is executed. Then, the digital multifunction peripheral 20 sends a reservation request command to the digital multifunction peripheral 10 which is a master machine. The reservation request command is configured by the parameters of username, reservation date, start time and end time as shown in FIG. 16A. The reservation management tables of the digital multifunction peripherals 10 to 30 are as shown in FIGS. 17A to 17C, respectively.

(2) Reservation Response Phase

Receiving the reservation request command, the digital multifunction peripheral 10 refers to the reservation management table held by the reservation management table holding section 1700 in the digital multifunction peripheral 10 to check whether or not the time shown in the reservation request command are already reserved. Then, the digital multifunction peripheral 10 sends a reservation response command to the digital multifunction peripheral 20 in accordance with the result of the checking. The time shown in the reservation request command means the period from the start time in the reservation request command to the end time in the command.

The reservation request command is configured by the parameters of username, reservation date, start time, end time, and status as shown in FIGS. 16B and 16C. The status indicates whether or not the time shown in the reservation request command are already reserved. As a result of referring to the reservation management table in the master machine, if the time shown in the reservation request command is not reserved, the status becomes "OK". If the time is already reserved, the status becomes "NG".

In the digital multifunction peripheral 20 which has received the reservation response command, any of the exclusive reservation execution result confirmation screens notifying completion of the reservation and impossibility of the reservation, respectively, is displayed as shown in FIGS. 11 and 12. When the reservation response command shown in FIG. 16B is received, the exclusive reservation execution result confirmation screen 2400 indicative of completion of the reservation is displayed. On the other hand, when the reservation response command shown in FIG. 16C is received, the exclusive reservation execution result confirmation screen 2600 indicative of impossibility of the reservation is displayed. Here, it is assumed that the reservation response command in FIG. 16B has been notified.

The reservation management table held by the reservation management table holding section 1700 in the digital multifunction peripheral 20 is as shown in FIG. 18B. To the reservation management table of the digital multifunction peripheral 20, username: "yamada", reservation date: "2006/6/6", start time: "9:00", end time: "10:00", status: "exclusive" and apparatus name: "MFP-B" are added as a new reservation record. Here, "yamada" is the username of the user B.

Meanwhile, a new reservation record is also added to the digital machine 10 which is a master machine as shown in FIG. 18A.

(3) Exclusive Release Permission Phase

The digital multifunction peripheral 10 which is a master machine checks whether or not all the apparatuses registered in a time reservation cooperation list are exclusively used at the current time.

As a result of checking the reservation status shown by the reservation management table, if all the apparatuses registered in the reservation cooperation list are exclusively used, the digital multifunction peripheral 10 causes all the apparatuses registered in the reservation cooperation list to transition to the exclusive releasable mode. In the first embodiment, "all the apparatuses" means the digital multifunction peripherals 10, 20 and 30. Here, "the case where all the apparatuses are exclusively used" includes the case where all the apparatuses are exclusively used by the same user and the case where the respective apparatuses are exclusively used by different users.

The digital multifunction peripheral 10 itself transitions to the exclusive releasable mode, while it issues an exclusive release permission command sends it to the digital multifunction peripherals 20 and 30, which is for causing them to transition to the exclusive releasable mode. Receiving the exclusive release permission command, the digital multifunction peripherals 20 and 30 transition to the exclusive releasable mode.

As a result of the digital multifunction peripherals 10, 20 and 30 having transitioned to the exclusive releasable mode, the reservation management tables held by the respective apparatuses are as shown in FIGS. 19A to 19C. That is, the digital multifunction peripheral 10 which is a master machine changes the statuses of all the reservation records in the reservation management table to "releasable". Meanwhile, each of the digital multifunction peripherals 20 and 30 which are subordinate machines changes the status of the reservation record in the reservation management table to "releasable".

Next, the detailed flow of the exclusive reservation processing executed in each digital multifunction peripheral will be described with reference to FIGS. 20 to 22.

Figure 20:
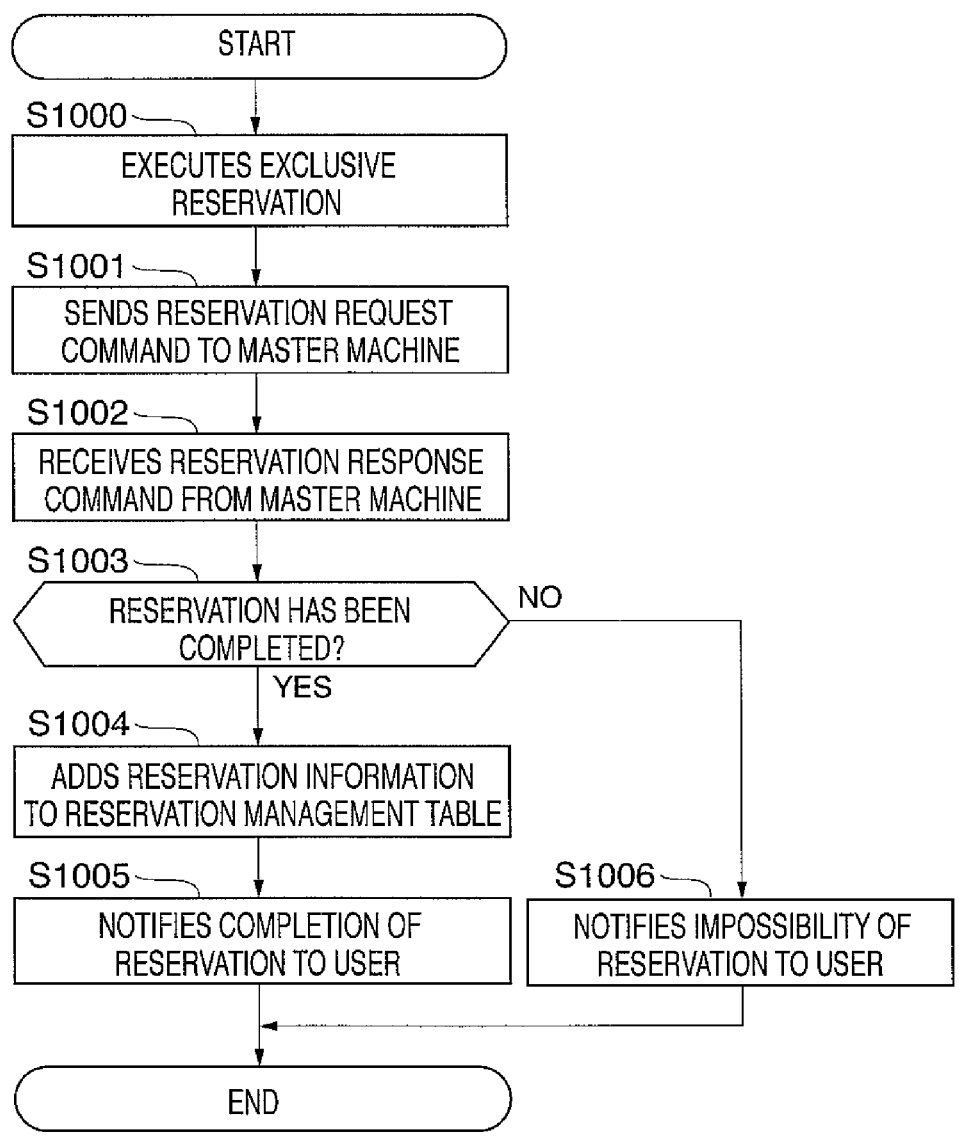
FIG. 20 is a flowchart showing a reservation execution process performed in the digital multifunction peripheral which is a subordinate machine.

FIG. 20 is a flowchart showing a reservation execution process performed in the digital multifunction peripheral which is a subordinate machine.

In FIG. 20, in step S1000, the subordinate machine displays the screen shown in each of FIGS. 7 to 10, and proceeds to step S1001 after detecting the reservation execution button 2210 being pressed. Here, it is assumed that a reservation to occupy the digital multifunction peripheral which is a subordinate machine has been made.

Next, in step S1001, the subordinate machine sends a reservation request command to the master machine indicated by the information held by the master machine information holding section 1730, and proceeds to step S1002. The processing described so far corresponds to the reservation request phase described above.

Next, in step S1002, the subordinate machine receives a reservation response command sent from the master machine, and proceeds to step S1003.

In step S1003, the subordinate machine determines whether or not the status in the received reservation response command is "OK". If the status is "OK", the process proceeds to step S1004. On the other hand, if the status is "NG", the process proceeds to step S1006.

In step S1004, the subordinate machine adds a reservation record as described above to the reservation management table held by the reservation management table holding section 1700, on the basis of the parameters included in the reservation response command, and proceeds to step S1005. In step S1005, the digital multifunction peripheral displays the exclusive reservation execution result confirmation screen 2400 in FIG. 11 on the touch panel 181.

On the other hand, in step S1006, the subordinate machine displays the exclusive reservation execution result confirmation screen in FIG. 12 on the touch panel 181.

Figure 21:
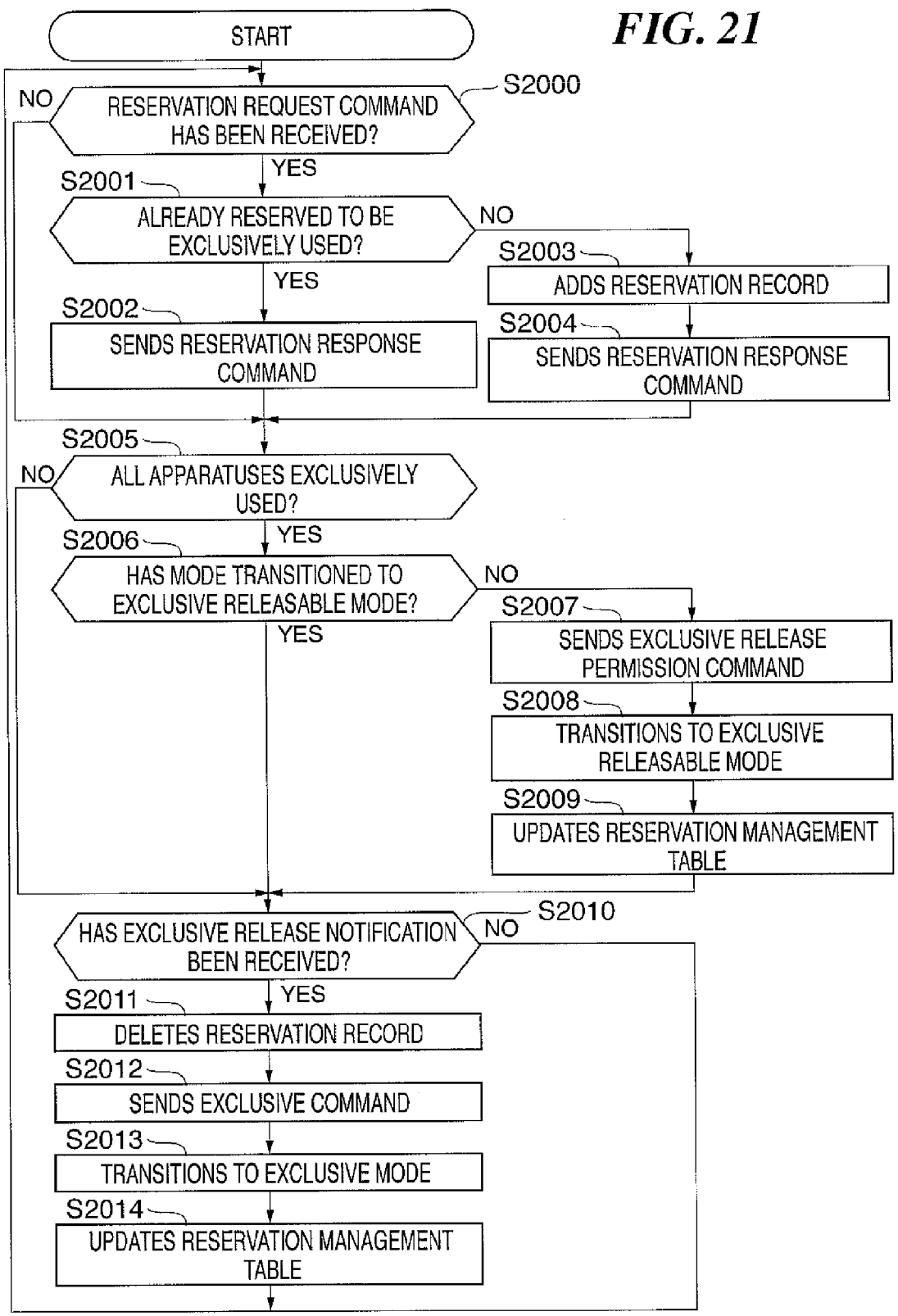
FIG. 21 is a flowchart showing a reservation execution process performed in the digital multifunction peripheral which is a master machine.

FIG. 21 is a flowchart showing a reservation execution process performed in the digital multifunction peripheral which is a master machine.

In step S2000, the master machine determines whether or not a reservation request command has been received from the subordinate machine. If a reservation request command has been received, the process proceeds to step S2001. If a reservation request command has not been received, the process proceeds to step S2005.

In step S2001, the master machine determines whether or not the time shown in the reservation request command is already reserved to be exclusively used. If it is already reserved, the process proceeds to step S2002. If it is not reserved, the process proceeds to step S2003.

In step S2002, the master machine sends a reservation response command in which the status is "NG" to the subordinate machine which sent the reservation request command.

On the other hand, in step S2003, the master machine adds the reservation record described above to the reservation management table on the basis of the parameters included in the reservation request command. Furthermore, in step S2004, the master machine sends a reservation response command in which the status is "OK" to the subordinate machine which sent the reservation request command.

When a user uses the exclusive reservation service on the master machine, the master machine determines whether the time specified on the reservation execution screen 2200 in FIG. 10 is already reserved to be exclusively used. If it is not reserved, the master machine adds a reservation record as described above to the reservation management table.

In step S2005, the master machine determines whether or not all the apparatuses registered in the reservation cooperation list are currently exclusively used, on the basis of the start time and the end time in each reservation record stored in the reservation management table. The "currently" stated here means the date and time indicated by the time and date information provided by the clock section 1600. If all the apparatuses are currently exclusively used, the process proceeds to step S2006. If at least one apparatus is not currently exclusively used, the process proceeds to step S2010.

In step S2006, the master machine determines whether or not each apparatus has already transitioned to the exclusive releasable mode. If each apparatus has already transitioned to the exclusive releasable mode, the process proceeds to step S2010. If each apparatus has not transitioned to the exclusive releasable mode yet, the process proceeds to step S2007.

In step S2007, the master machine sends an exclusive release permission command to all the subordinate machines. The exclusive release permission command is for instructing transition to the exclusive releasable mode.

Furthermore, in step S2008, the master machine transitions to the exclusive releasable mode. Then, in step S2009, the master machine updates the reservation management table. Specifically, the status of such a reservation record that the time indicated by the date and time information provided by the clock section 1600 is between the start time and the end time is changed to "releasable".

By the processing in the steps S2007 and S2008, exclusive of apparatuses which are not used by users can be released by the processing in the steps S2007 and S2008, even when all the apparatuses are exclusively used.

In step S2010, the master machine determines whether or not an exclusive release notification has been received from at least one subordinate machine. The exclusive release notification is for notifying that the exclusive mode has been released by a user. If the exclusive release notification has been received, the process proceeds to step S2011. If the exclusive release notification has not been received, the process returns to the step S2000.

In step S2011, the master machine deletes such a reservation record corresponding to the exclusive release notification, from among the reservation records stored in the reservation management table. Specifically, such a reservation record that the apparatus name indicates the subordinate machine which sent the exclusive release notification and the time indicated by the date and time information provided by the clock section 1600 is between the start time and the end time is deleted.

In step S2012, the master machine sends an exclusive command to the subordinate machines other than the subordinate machine which sent the exclusive release notification. The exclusive command is for instructing transition to the exclusive mode. Furthermore, in step S2013, the master machine transitions to the exclusive mode. Then, in step S2014, the master machine updates the reservation management table. Specifically, the master machine changes the status of a reservation record in which the status is "releasable", to "exclusively used".

When the master machine is instructed to release exclusive by a user, the master machine releases exclusive, and deletes the reservation record related to the released exclusive from the reservation management table. At the same time, the master machine sends an exclusive command to all the subordinate machines to update the reservation records related to the subordinate machines. Specifically, the status of the reservation record that, the time indicated by the date and time information being provided by the clock section 1600 is between the start time and the end time, is changed to "exclusively used".

In step S2005 of this process, though determination is made on "whether or not all the apparatuses registered in the reservation cooperation list are exclusively used", determination may be made on "whether or not a predetermined number of apparatuses or more are exclusively used". In this case, if the predetermined number of apparatuses or more are exclusive, the process proceeds to step S2006. If only less than the predetermined number of apparatuses are exclusive, the process proceeds to step S2009.

Figure 22:
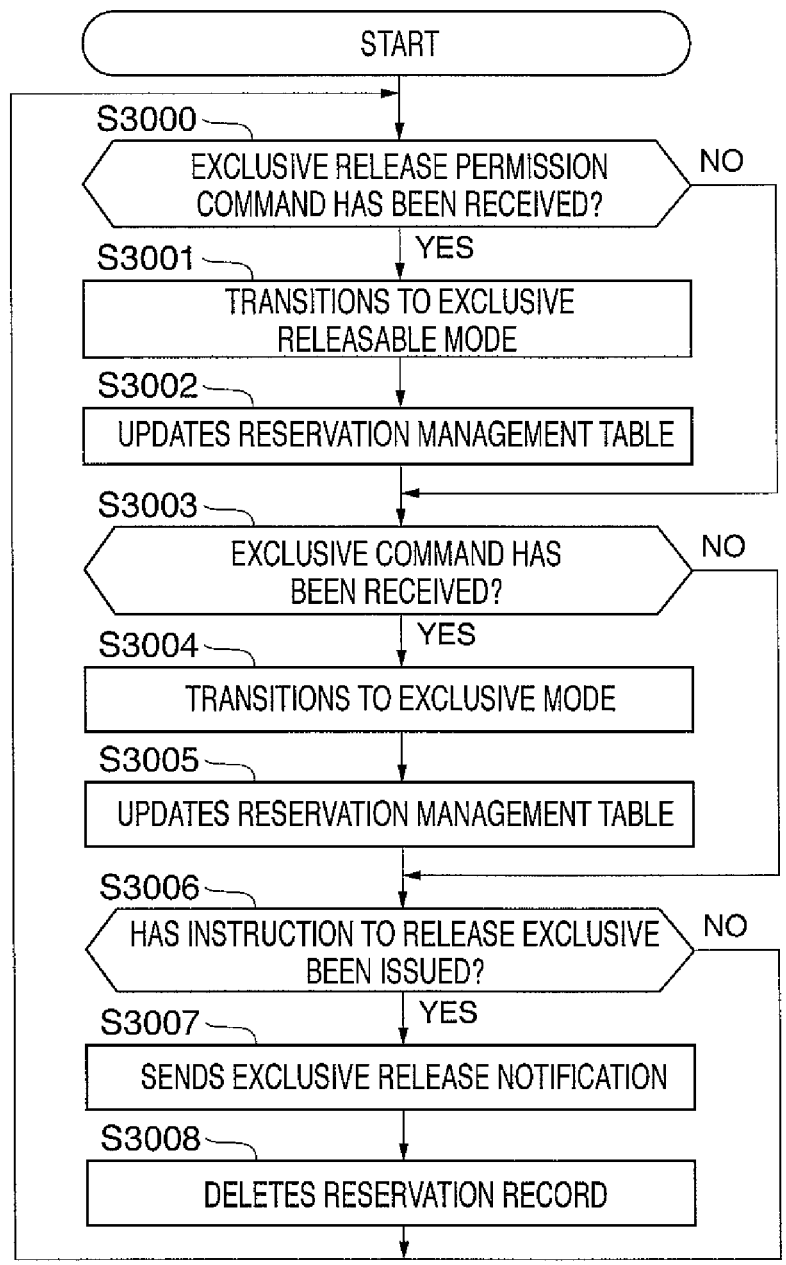
FIG. 22 is a flowchart showing an operation process of the digital multifunction peripheral which is a subordinate machine.

FIG. 22 is a flowchart showing an operation process of the digital multifunction peripheral which is a subordinate machine.

In step S3000, the subordinate machine determines whether or not an exclusive release permission command has been received from the master machine. If an exclusive release permission command has been received, the process proceeds to step S3001. If an exclusive release permission command has not been received, the process proceeds to step S3003.

In step S3001, the subordinate machine transitions to the exclusive releasable mode. Thereby, it is possible to release exclusive in accordance with an instruction from a user other than the user who reserved the exclusive. After that, in step S3002, the subordinate machine updates the reservation management table. Specifically, the status of a reservation record that, the time indicated by the date and time information being provided by the clock section 1600 is between the start time and the end time, is changed to "releasable".

In step S3003, the subordinate machine determines whether or not an exclusive command has been received from the master machine. If an exclusive command has been received, the process proceeds to step S3004. If the exclusive command has not been received, the process proceeds to step S3006.

In step S3004, the subordinate machine transitions to the exclusive mode. Then, in step S2013, the subordinate machine updates the reservation management table. Specifically, the subordinate machine changes the status of a reservation record in which the status is "releasable", to "exclusive".

In step S3006, the subordinate machine determines whether an instruction to release exclusive has been received from a user. If the instruction to release exclusive has been received, the process proceeds to step S3007. If an instruction to release exclusive has not been received, the process returns to the step S3000.

In step S3007, the subordinate machine sends an exclusive release notification to the master machine. Then, in step S3008, the subordinate machine deletes a reservation record corresponding to the exclusive release notification, from among the reservation records stored in the reservation management table. Specifically, a reservation record that, the time indicated by the date and time information being provided by the clock section 1600 is between the start time and the end time, is deleted. Thereby, the exclusive of the subordinate machine is released.

Figure 23:
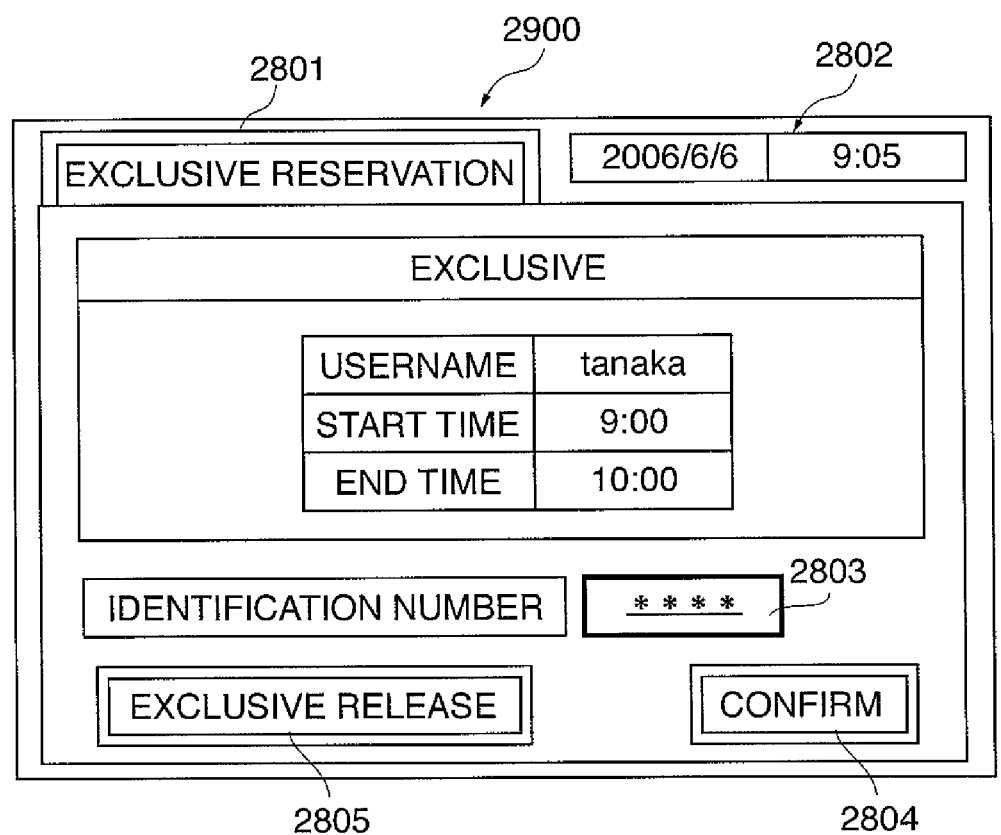
FIG. 23 is a diagram showing an example of the "exclusive" screen to be displayed on the touch panel when the digital multifunction peripheral transitions to the exclusive releasable mode.

FIG. 23 is a diagram showing an example of an "exclusive use" screen to be displayed on the touch panel 181 when the digital multifunction peripheral transitions to the exclusive releasable mode.

In FIG. 23, an exclusive release-function-equipped "exclusive" screen 2900 is the "exclusive" screen 2800 to which an exclusive release button 2805 is added. By pressing the exclusive release button 2805, a user can instruct release of exclusive. This exclusive release-function-equipped "exclusive" screen 2900 is displayed on any of the master and subordinate machines in the exclusive releasable mode.

When the exclusive release button 2805 is pressed, a new identification number can be accepted. The new identification number is a common password. When the common password is inputted by a user, the digital multifunction peripheral to which it has been inputted is released from the exclusive status.

According to the first embodiment described above, if all the apparatuses on the reservation cooperation list are exclusively reserved during a certain time period as a result of a user exclusive reservation of a digital multifunction peripheral constituting the printing system, the master machine sends an exclusive release permission command to each subordinate machine. Each subordinate machine which has received the exclusive release permission command and the master machine transition from the exclusive mode in which release of exclusive is not accepted to the exclusive releasable mode in which release of exclusive use by a user other than the user who reserved the exclusive use is accepted, and display the exclusive release-function-equipped "exclusive" screen 2900. Thereby, even when a plurality of apparatuses are exclusively reserved during the same time period, it is possible that the exclusive status of such an apparatus as is not being used by a user who reserved the exclusive use can be released by a user other than the user who reserved the exclusive use.

The configuration of a printing system to which is applied a processing apparatus according to a second embodiment of the present invention is the same as that of the printing system in FIG. 1 according to the first embodiment described above. As for parts similar to those of the first embodiment, the same reference numerals are used, and description of the parts are omitted. In the following, a description will be given of only different points from the first embodiment.

In the first embodiment, description has been made on a method for transitioning to the exclusive releasable mode and releasing exclusive with the use of a common password in the case where all the apparatuses on the reservation cooperation list are exclusively reserved.

In the second embodiment, description will be made on a method for compulsorily releasing exclusive of an apparatus which has been exclusive but is not used in the case where all the apparatuses on the reservation cooperation list are exclusive during a certain time period.

Figure 24:
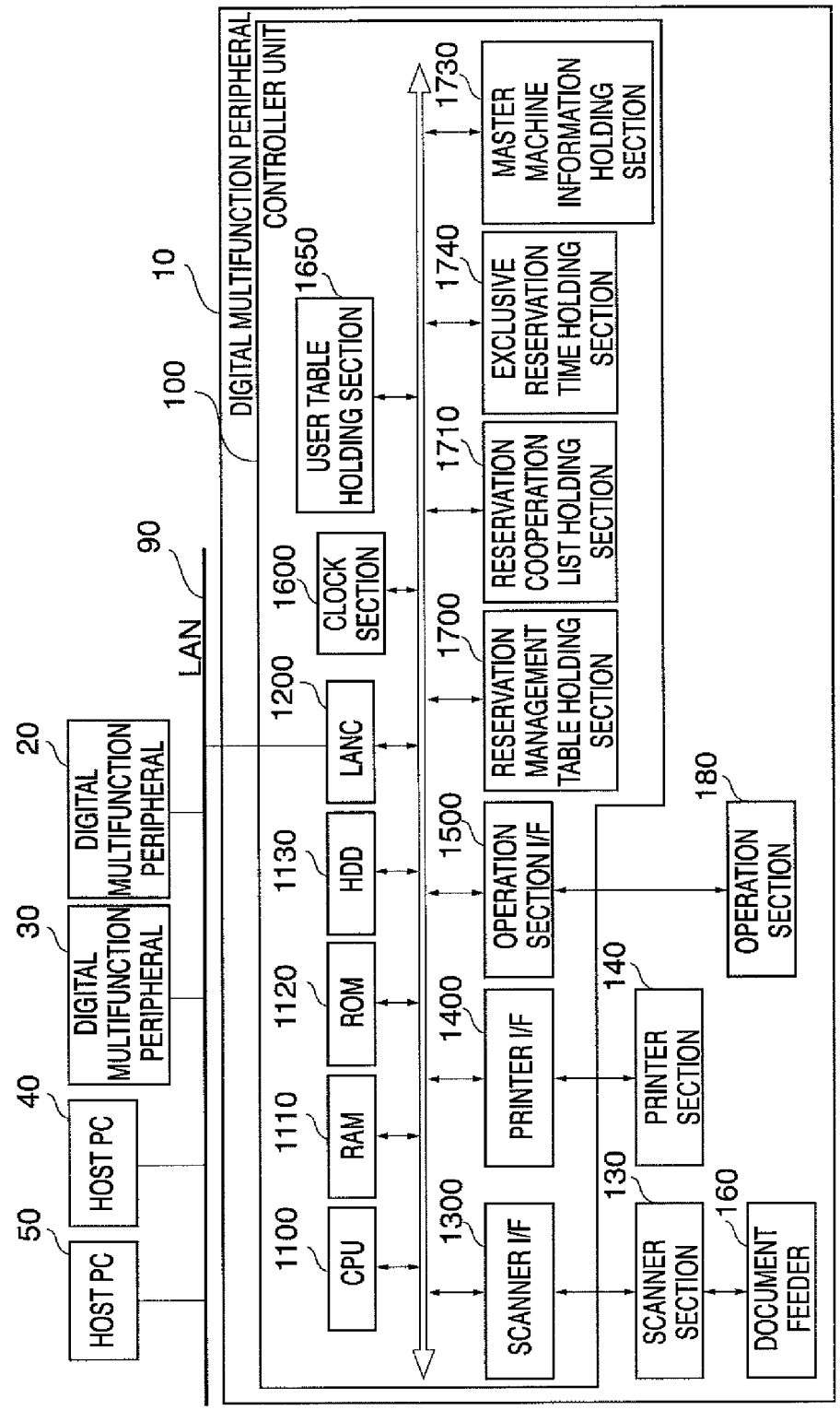
FIG. 24 is a block diagram showing a configuration example of a printing system to which is applied a processing apparatus according to a second embodiment of the present invention, and the internal configuration of a digital multifunction peripheral.

FIG. 24 is a block diagram showing a configuration example of a printing system to which is applied a processing apparatus according to the second embodiment of the present invention, and the internal configuration of a digital multifunction peripheral.

In FIG. 24, unlike the digital multifunction peripheral 10 shown in FIG. 2 in the first embodiment, a digital multifunction peripheral 10 is provided with an exclusive reservation time holding section 1740 instead of the reservation master flag holding section 1720. The exclusive reservation time holding section 1740 is for holding exclusive release time. The exclusive release time is time required until the exclusive status of an apparatus is compulsorily and automatically released.

Next, the flow of the exclusive reservation processing and the exclusive release processing in the printing system in this second embodiment will be described with reference FIG. 25.

Figure 26A:
FIG. 26A is a diagram showing the reservation status and the exclusive release time of the printing system before a reservation is made.
Figure 26B:
FIG. 26B is a diagram showing the reservation status and the exclusive release time of the printing system after the reservation is made.

FIG. 25 is a diagram showing the flow of an exclusive reservation process and an exclusive release process performed in the printing system in FIG. 24. FIG. 26A is a diagram showing the reservation status and the exclusive release time before an exclusive is reserved, and FIG. 26B is a diagram showing the reservation status and the exclusive release time after the exclusive reservation is accepted. In FIGS. 26A and 26B, the reservation management table is shown as a reservation table.

The exclusive reservation processing is the same as that of the first embodiment, and the reservation request command and the reservation response command are sent and received between a master machine and a subordinate machine to reserve exclusive of the digital multifunction peripheral. In this second embodiment, a description will be made on the case where the digital multifunction peripheral 20 newly makes a reservation.

In FIG. 26A, the digital multifunction peripherals 10 to 30 are individually reserved to be exclusive before a reservation is made. Ten minutes is set as a default value of the exclusive release time in this status.

In FIG. 26B, by the digital multifunction peripheral 20 being newly reserved to be exclusive ((1) and (2)), the digital multifunction peripherals 10 to 30 are exclusively reserved during the same time period. Then, determining that all the apparatuses registered in the reservation cooperation list have transitioned to the exclusive status during the same time period, the master machine changes the exclusive release time to five minutes.

In the case of changing the exclusive release time, the digital multifunction peripheral 10 which is a master machine sends the exclusive release time to each subordinate machine ((3)), and each subordinate machine changes the exclusive release time from the default value ten minutes to five minutes, on the basis of the received exclusive release time. After that, each subordinate machine sends an exclusive release notification to the master machine when the exclusive release time has elapsed ((4)) in order to notify the master machine that the exclusive release time has elapsed. When receiving the exclusive release notification from each subordinate machine, the master machine determines a subordinate machine to be released from exclusive, and sends an exclusive release command to the subordinate machine ((5)).

Next, the detailed flow of the exclusive reservation processing and the exclusive release processing executed in each digital multifunction peripheral will be described with reference to FIGS. 27 and 28.

Figure 27:
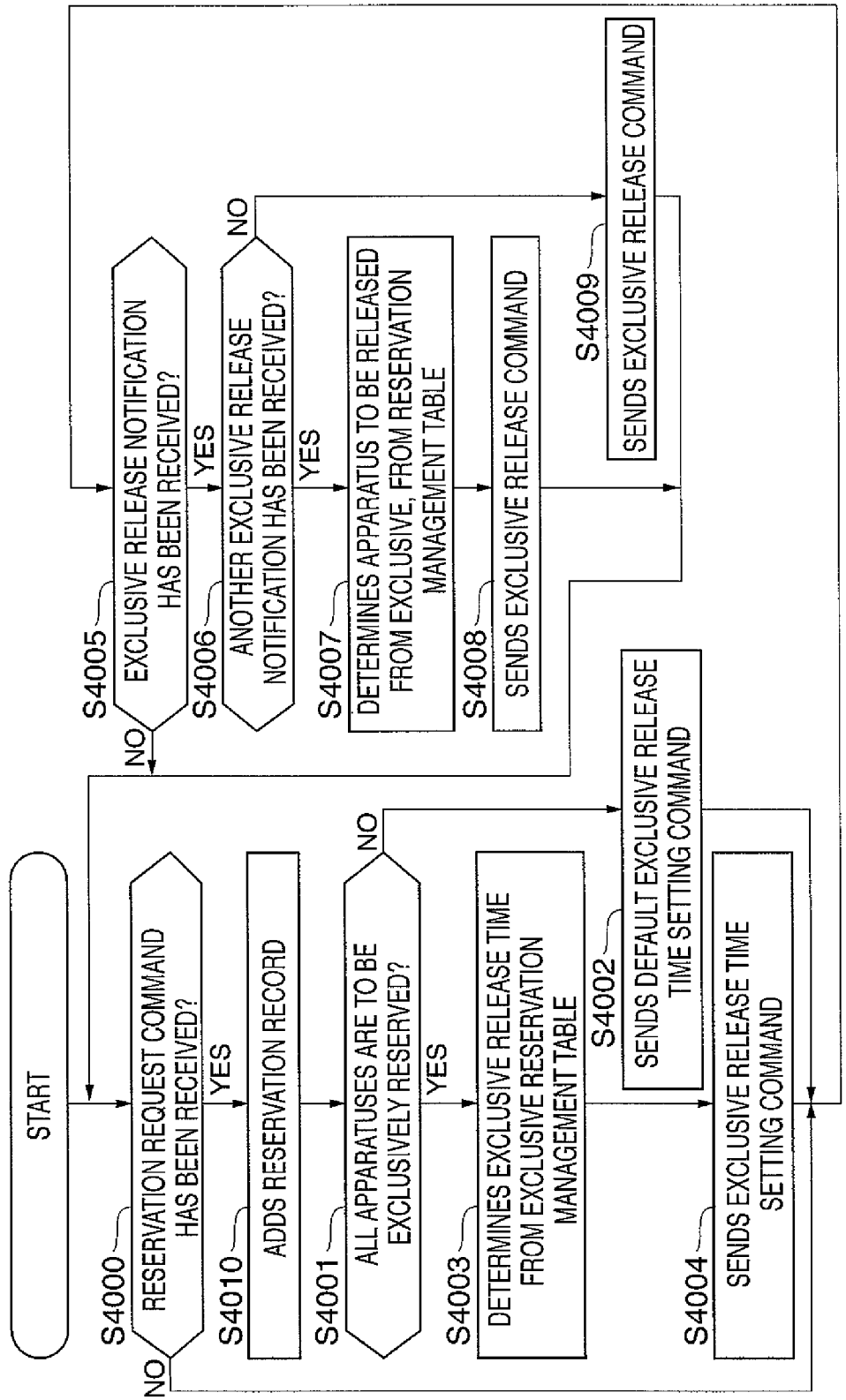
FIG. 27 is a flowchart showing an operation process of exclusive reservation and exclusive release performed in a master machine.

FIG. 27 is a flowchart showing an operation process of exclusive reservation and exclusive release performed in the master machine.

In step S4000, the master machine determines whether or not a reservation request command has been received from a subordinate machine. If a reservation request command has been received, the process proceeds to step S4010. In step S4010, the master machine adds a new reservation record to the reservation management table held by the master machine itself, on the basis of the contents of the reservation request command, and sends a reservation response command to the subordinate machine which sent the reservation request command. In the second embodiment, it is assumed that the reservation request command has been received from the digital multifunction peripheral MFP-B which is a subordinate machine. When reservation contents are inputted to the master machine itself, the master machine adds a new reservation record to the reservation management table it holds, on the basis of the reservation contents, and proceeds to step S4001. If a reservation request command has been received, or the reservation contents have not been inputted to the master machine, the process proceeds to step S4005.

In step S4001, the master machine refers to the updated reservation management table, and determines whether or not all the apparatuses registered in the reservation cooperation list are to be exclusively reserved during the time period specified in the reservation request command or the reservation contents. If all the apparatuses are to be exclusively reserved during the time period specified in the reservation request command or the reservation contents, as a result of the determination, the process proceeds to step S4003. Otherwise, it proceeds to step S4002.

In step S4002, the master machine sends an exclusive release time setting command to the subordinate machine (MFP-B) which sent the reservation request command. The exclusive release time setting command is for, by specifying a default exclusive release time (ten minutes in the second embodiment) and a time period specified in a reservation request command or reservation contents, setting exclusive release time for an exclusive reservation corresponding to the time period. If the reservation contents are inputted on the master machine, the master machine sets the default exclusive release time in association with the exclusive reservation corresponding to the time period specified in the reservation request command or the reservation contents.

In step S4003, the master machine determines new exclusive release time. The exclusive release time determined in step S4003 is assumed to be shorter than the default exclusive release time.

In step S4004, the master machine sends an exclusive release time setting command to all the subordinate machines registered in the reservation cooperation list. This exclusive release time setting command specifies the exclusive release time determined in the step S4003 and the time period specified in the reservation request command or the reservation contents. In step S4004, the determined new exclusive release time is set for the master machine itself also.

In the second embodiment, since it is assumed that setting is made for all the apparatuses, exclusive release time registered in advance is set. However, there may be a case where the exclusive release time is calculated from the ratio of all the apparatuses registered in the reservation cooperation list and the exclusive apparatuses in the step S4003.

In step S4005, the master machine determines whether an exclusive release notification has been received from a subordinate machine. If an exclusive release notification has been received from a subordinate machine, the process proceeds to step S4006. If an exclusive release notification has not been received from a subordinate machine, the process proceeds to the step S4000. In step S4006, the master machine determines whether or not another exclusive release notification has been received within a predetermined time period. If another exclusive release notification has not been received, as the result of the determination, the process proceeds to step S4009. Otherwise, it proceeds to step S4007.

In step S4009, the master machine sends an exclusive release command to the subordinate machine which sent the exclusive release notification, and proceeds to the step S4000.

In step S4007, since multiple exclusive release notifications have been received, the master machine refers to the reservation management table to determine an apparatus to be released from exclusive, and proceeds to step S4008. The master machine determines the apparatus to be released from exclusive on the basis of apparatuses registered in advance, an apparatus registered last, or the like.

In step S4008, the master machine sends an exclusive release command to the apparatus determined in step S4007, and proceeds to step S4000.

Though it is determined in the step S4001 "whether or not all the apparatuses registered in the reservation cooperation list are to be exclusively reserved", it may be determined "whether or not a predetermined number of apparatuses or more are to be exclusively reserved". In this case, if the predetermined number of apparatuses or more are exclusively reserved, the process proceeds to step S4003. If only less than the predetermined number of apparatuses are exclusively reserved, the process proceeds to step S4002.

Next, the operation processing of each subordinate machine will be described with reference to FIG. 28.

Figure 28:
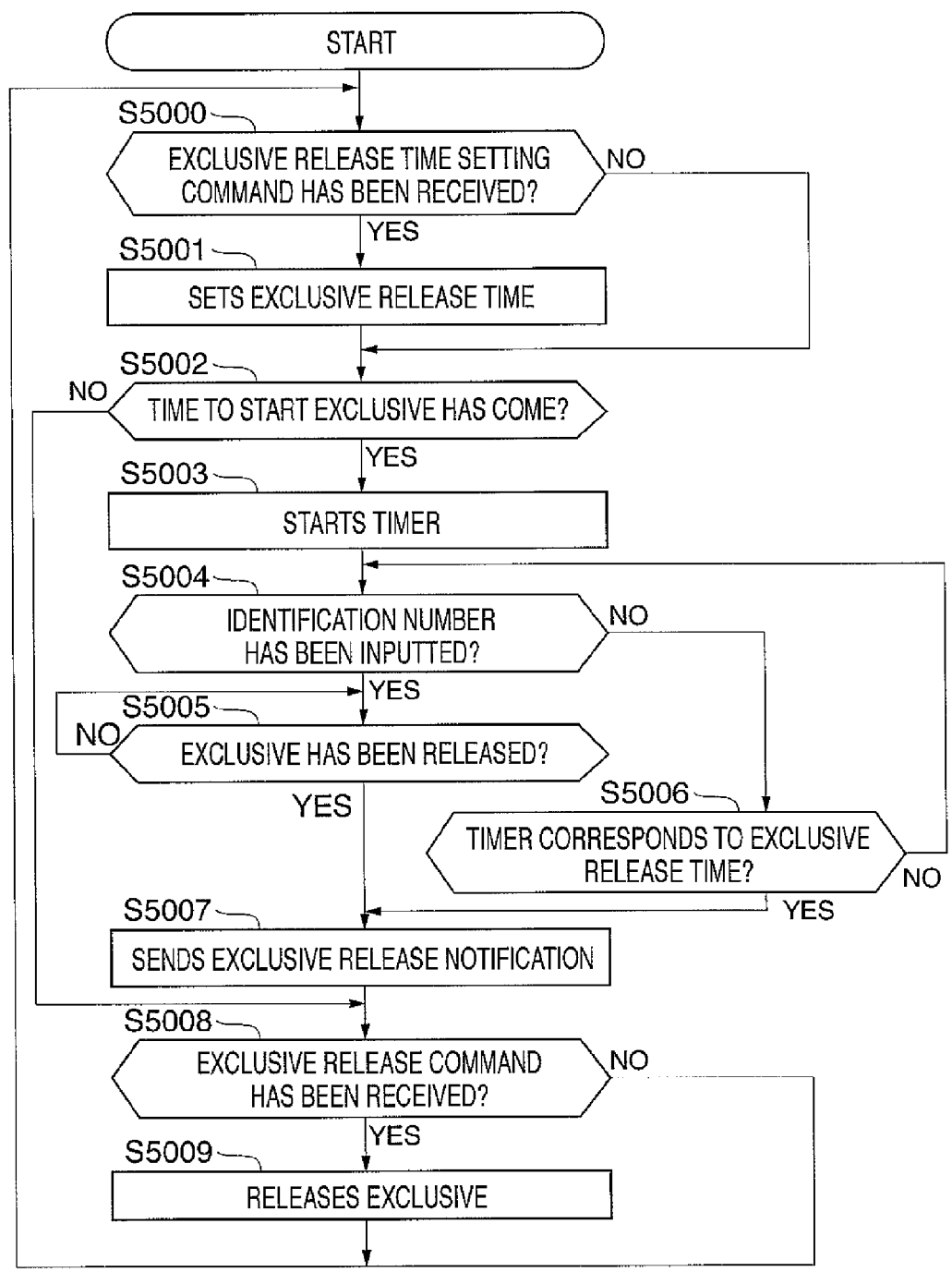
FIG. 28 is a flowchart showing an exclusive release process performed in a subordinate machine.

FIG. 28 is a flowchart showing an exclusive release process performed in a subordinate machine. The exclusive reservation process is performed in accordance with the flowchart in FIG. 20.

In step S5000, the subordinate machine determines whether or not an exclusive release time setting command has been received from the master machine. If an exclusive release time setting command has been received, the process proceeds to step S5001. If an exclusive release time setting command has not been received, the process proceeds to step S5002.

In step S5001, the subordinate machine sets the exclusive release time in an exclusive reservation corresponding to the time period specified by the exclusive release time setting command to the exclusive release time specified by the exclusive release time setting command.

In step S5002, the subordinate machine refers to the reservation records stored in the reservation management table to determine whether the current time has reached the start time of any reservation record. If the current time has reached the start time of any reservation record, the process proceeds to step S5003. If the current time has not reached the start time of any reservation record, the process proceeds to step S5008.

In step S5003, the subordinate machine causes a timer to start. Next, in step S5004, the subordinate machine determines whether the user who reserved the exclusive inputted a correct identification number on the "exclusive" screen 2900 in FIG. 23. If the user who reserved the exclusive use inputted a correct identification number, as the result of the determination, the process proceeds to step S5005. Otherwise, it proceeds to step S5006.

In step S5006, the subordinate machine determines whether or not the time counted by the timer corresponds to the exclusive release time. If the counted time corresponds to the exclusive release time, the process proceeds to step S5007. Otherwise, the process returns to the step S5004.

In step S5005, the subordinate machine determines whether or not the exclusive has been released. If the exclusive has been released, the process proceeds to step S5007. When the user who reserved the exclusive use releases the exclusive, or when the current time reaches the end time of the exclusive, the exclusive is released.

In step S5007, the subordinate machine sends an exclusive release notification to the master machine.

In step S5008, the subordinate machine determines whether or not an exclusive release command has been received from the master machine. When receiving an exclusive release command from the master machine (YES to the step S5008), the subordinate machine releases the exclusive (step S5009). To release an exclusive reservation means deleting a reservation record from the reservation management table.

According to the second embodiment described above, if all the apparatuses on the reservation cooperation list are exclusively reserved during the same time period as a result of a user reserving exclusive use of the digital multifunction peripheral constituting the printing system, the master machine sends new exclusive release time to each subordinate machine. Each subordinate machine and the master machine change the setting to the new exclusive release time. When use by the occupant is not confirmed within a predetermined time period after the start time, an exclusive release flag is sent to the master machine. When receiving another exclusive release flag after receiving the first exclusive release flag, the master machine determines an apparatus to be released from exclusive, on the basis of the reservation management table, and sends an exclusive release signal to the apparatus to cause it to transition to the reservation releasable mode. Thereby, it is possible to, while keeping the convenience for a user who reserved exclusive use of the digital multifunction peripheral, reduce the waiting time of a user who is waiting for release of the exclusive.

In the first and second embodiments described above, description has been made on examples in which the present invention is applied to an image processing apparatus such as a digital multifunction peripheral, but this is not limitative. It goes without saying that the present invention is applicable to an image forming apparatus such as a printer or an image reading apparatus such as a scanner.

Furthermore, though reservation of each apparatus is managed by a digital multifunction peripheral which is a master machine in the above embodiments, it is also possible to cause an apparatus such as a server or a PC to perform the reservation management processing performed by the master machine in the above embodiments.

Furthermore, in the step S2005 or the step S4001 in the above embodiments, the master machine determines whether or not all the apparatuses are to be exclusively reserved (used), but this is not limitative. The master machine may determine whether or not a predetermined number of apparatuses are to be exclusively reserved. For example, the master machine may determine whether or not more than half of all the apparatuses are to be exclusively reserved, or whether or not nine machines out of ten machines are to be exclusively reserved.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium. In this case, the program code itself read from the storage medium realizes the functions of either of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Moreover, it is understood that the functions of either of the above described embodiments may be realized not necessarily by causing the computer to read and execute the program code, but alternatively by causing an operating system (OS) running on the computer to perform part or all of the actual processing based on instructions in the program code. In this case, the program code may be supplied directly from a storage medium on which the program code is stored, or from a computer, database, or the like, not shown, that is connected via the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-304036, filed Nov. 9, 2006, which is hereby incorporated by reference herein in its entirety.

What is claimed is:

1. A processing apparatus capable of communicating with a plurality of apparatuses, comprising:
   a reservation information storing unit adapted to store reservation information about user-reservations for priority use of the plurality of apparatuses;
   a determining unit adapted to determine whether or not the number of apparatuses which are not user-reserved for priority use during a predetermined time period among the plurality of apparatuses is greater than or equal to a predetermined number, by referring to the reservation information; and
   a switching unit adapted to switch whether or not to enable release of a user-reservation for priority use of at least one of the apparatuses user-reserved for priority use during the predetermined time period, based on a determination result of said determining unit, the release of the user-reservation for priority use adapted to release at least one user's reservation for priority use of the at least one of the apparatuses user-reserved for priority use during the predetermined time period,
   wherein said switching unit is adapted to enable release of the user-reservation for priority use of the at least one of the apparatuses user-reserved for priority use during the predetermined time period, when the number of apparatuses which are not user-reserved for priority use during a predetermined time period among the plurality of apparatuses is equal to the predetermined number, and said switching unit is adapted to disable release of the user-reservation for priority use of the at least one of the apparatuses user-reserved for priority use during the redetermined time period, when the number of apparatuses which are not user-reserved for priority use during a predetermined time period among the plurality of apparatuses is greater than the predetermined number.

2. A processing apparatus according to claim 1, wherein the processing apparatus is included in the plurality of apparatuses as one of the plurality of apparatuses.

3. A processing apparatus according to claim 1, wherein the reservation information is configured by at least a reservation date and time, an apparatus name and a username.

4. A processing apparatus according to claim 1, wherein the plurality of apparatuses are image forming apparatuses.

5. A processing apparatus according to claim 2, further comprising:
   an issuing unit adapted to issue an instruction to enable release of the user-reservation for priority use of the at least one of the apparatuses;
   a receiving unit adapted to receive the instruction issued by said issuing unit; and
   a display unit adapted to display a screen indicating that the processing apparatus is user-reserved for priority use,
   wherein said display unit is adapted to display a screen for receiving the instruction to enable release of the user-reservation for priority use of the at least one of the apparatuses.

6. A control method for a processing apparatus capable of communicating with a plurality of apparatuses, comprising the steps of:
   storing reservation information about user-reservations for priority use of the plurality of apparatuses;
   determining whether or not the number of apparatuses which are not user-reserved for priority use during a predetermined time period among the plurality of apparatuses is greater than or equal to a predetermined number, by referring to the reservation information; and
   switching whether or not to enable release of a user-reservation for priority use of at least one of the apparatuses user-reserved for priority use during the predetermined time period, based on a determination result from said determining step, the release of the user-reservation for priority use releasing at least one user's reservation for priority use of the at least one of the apparatuses user-reserved for priority use during the predetermined time period,
   wherein said switching is adapted to enable release of the user-reservation for priority use of the at least one of the apparatuses user-reserved for priority use during the predetermined time period, when the number of apparatuses which are not user-reserved for priority use during a predetermined time period among the plurality of apparatuses is equal to the predetermined number, and said switching is adapted to disable release of the user-reservation for priority use of the at least one of the apparatuses user-reserved for priority use during the predetermined time period, when the number of apparatuses which are not user-reserved for priority use during a predetermined time period among the plurality of apparatuses is greater than the predetermined number.

7. A processing apparatus according to claim 1, wherein said switching unit is adapted to enable release of the user-reservation for priority use of the at least one of the apparatuses user-reserved for priority use during the predetermined time period, when the number of apparatuses which are not user-reserved for priority use during a predetermined time period among the plurality of apparatuses is less than the predetermined number.

8. A processing apparatus according to claim 1, wherein the predetermined number is zero.

\* \* \* \* \*